US012647205B2

(12) United States Patent
Park et al.

(10) Patent No.: US 12,647,205 B2
(45) Date of Patent: *Jun. 2, 2026

(54) METHOD AND DEVICE FOR APPLYING OPTIMIZED PHASE ROTATION TO BROADBAND IN WIRELESS LAN SYSTEM

(71) Applicant: LG ELECTRONICS INC., Seoul (KR)

(72) Inventors: Eunsung Park, Seoul (KR); Jinyoung Chun, Seoul (KR); Jinsoo Choi, Seoul (KR); Dongguk Lim, Seoul (KR)

( * ) Notice: Subject to any disclaimer, the term of this patent is extended or adjusted under 35 U.S.C. 154(b) by 567 days.

This patent is subject to a terminal disclaimer.

(21) Appl. No.: 17/923,128

(22) PCT Filed: May 10, 2021

(86) PCT No.: PCT/KR2021/005780

§ 371 (c)(1),
(2) Date: Nov. 3, 2022

(87) PCT Pub. No.: WO2021/235753

PCT Pub. Date: Nov. 25, 2021

(65) Prior Publication Data

US 2023/0179330 A1      Jun. 8, 2023

(30) Foreign Application Priority Data

May 21, 2020      (KR) ........................ 10-2020-0060790

(51) Int. Cl.
*H04L 1/00*          (2006.01)
*H04L 5/00*          (2006.01)
(Continued)

(52) U.S. Cl.
CPC ........... *H04L 1/0069* (2013.01); *H04W 84/12* (2013.01)

(58) Field of Classification Search
None
See application file for complete search history.

(56) References Cited

U.S. PATENT DOCUMENTS 10,356,781 B2 *   7/2019   Seok ................. H04W 74/0816
11,962,371 B2 *   4/2024   Park ..................... H04W 84/12
(Continued)

FOREIGN PATENT DOCUMENTS

WO      WO-2018152224 A1 *   8/2018   ........... H04L 5/0058
WO      2020-050527 A1      3/2020

OTHER PUBLICATIONS

Au, Edward, IEEE 802.11-19/1262r7 (Jan. 2020) (Year: 2020).*
(Continued)

*Primary Examiner* — Jenee Holland
*Assistant Examiner* — Michael William Abbatine, Jr.
(74) *Attorney, Agent, or Firm* — BRYAN CAVE LEIGHTON PAISNER LLP

(57)      ABSTRACT

A method and a device for receiving a PPDU in a wireless LAN system are presented. Specifically, a receiving STA receives a PPDU from a transmitting STA through a broadband and decodes the PPDU. The PPDU includes a legacy preamble and first and second signal fields. The legacy preamble and the first and second signal fields are generated on the basis of a first phase rotation value. When the broadband is a 320 MHz band, the first phase rotation value is [1 1 1 −1 1 1 1 −1 −1 −1 −1 1 −1 −1 1 −1].

11 Claims, 15 Drawing Sheets receiving, by a receiving station (STA), a Physical Protocol Data Unit (PPDU) from a transmitting STA through a broadband      ~S1510 decoding, by the receiving STA, the PPDU, wherein the PPDU includes a legacy preamble, first and second signal fields, wherein the legacy preamble and the first and second signal fields are generated based on a first phase rotation value, and wherein when the broadband is a 320MHz band, the first phase rotation value is [1 1 1 -1 1 1 1 -1 -1 -1 -1 1 -1 -1 1 -1].      ~S1520

(51) Int. Cl.
    *H04L 27/26*     (2006.01)
    *H04W 72/04*     (2023.01)
    *H04W 84/12*     (2009.01)

(56)          References Cited

U.S. PATENT DOCUMENTS

| | | | |
|---|---|---|---|
| 12,206,536 B2 * | 1/2025 | Park | H04L 27/2603 |
| 2019/0199491 A1 * | 6/2019 | Verma | H04W 74/08 |
| 2020/0228380 A1 * | 7/2020 | Yang | H04L 5/0039 |
| 2021/0144696 A1 * | 5/2021 | Cariou | H04B 7/0452 |
| 2021/0160649 A1 * | 5/2021 | Liu | H04R 3/04 |
| 2021/0250125 A1 * | 8/2021 | Park | H04L 27/2603 |
| 2023/0121707 A1 * | 4/2023 | Park | H04L 1/0069 |
| | | | 370/329 |

OTHER PUBLICATIONS

Park, et al., "Phase Rotation Proposal Follow-up", IEEE 802.11-20/0699r0, May 6, 2020, See Slides 2-11 and 21.
Liang, et al., Phase Rotations Design for EHT', IEEE 802.11-19/1981r1, Jan. 12, 2020, See Slide 6.
Park, et al., "Phase Rotation for 320MHz", IEEE 802.11-19/1493r1, Nov. 13, 2019, See Slides 3-4.
Lee, et al., "Further Discussion on Bandwidth and Puncturing Information", IEEE 802.11-20/0606r2, May. 1, 2020, See Slides 4 and 6.

* cited by examiner (a)

Figure 4:
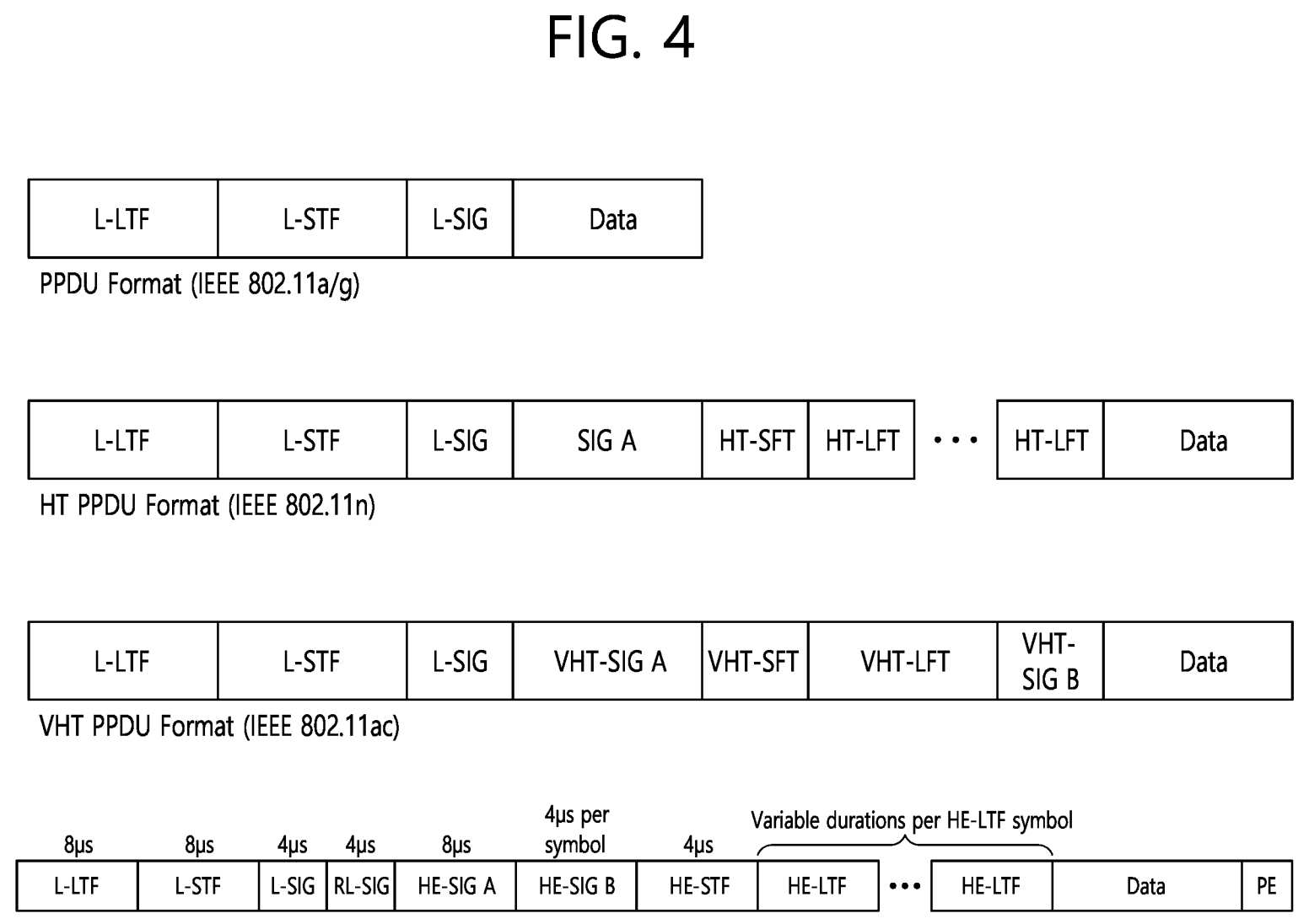

| L-LTF | L-STF | L-SIG | Data |
|-------|-------|-------|------|

PPDU Format (IEEE 802.11a/g)

| L-LTF | L-STF | L-SIG | SIG A | HT-SFT | HT-LFT | ... | HT-LFT | Data |
|-------|-------|-------|-------|--------|--------|-----|--------|------|

HT PPDU Format (IEEE 802.11n)

| L-LTF | L-STF | L-SIG | VHT-SIG A | VHT-SFT | VHT-LFT | VHT-SIG B | Data |
|-------|-------|-------|-----------|---------|---------|-----------|------|

VHT PPDU Format (IEEE 802.11ac)

| 8µs | 8µs | 4µs | 4µs | 8µs | | 4µs per symbol | 4µs | | | Variable durations per HE-LTF symbol | | |
|-----|-----|-----|-----|-----|---|----------------|-----|---|---|--------------------------------------|---|---|
| L-LTF | L-STF | L-SIG | RL-SIG | HE-SIG A | HE-SIG B | | HE-STF | HE-LTF | ... | HE-LTF | Data | PE |

| L-STF | L-LTF | L-SIG | RL-SIG | U-SIG | EHT-SIG | EHT-STF | EHT-LTF | Data |
|-------|-------|-------|--------|-------|---------|---------|---------|------|

Receiving a signal/field ~S400

Decoding the received signal/field ~S500

Processing the decoded signal/field ~S600

FIG. 14

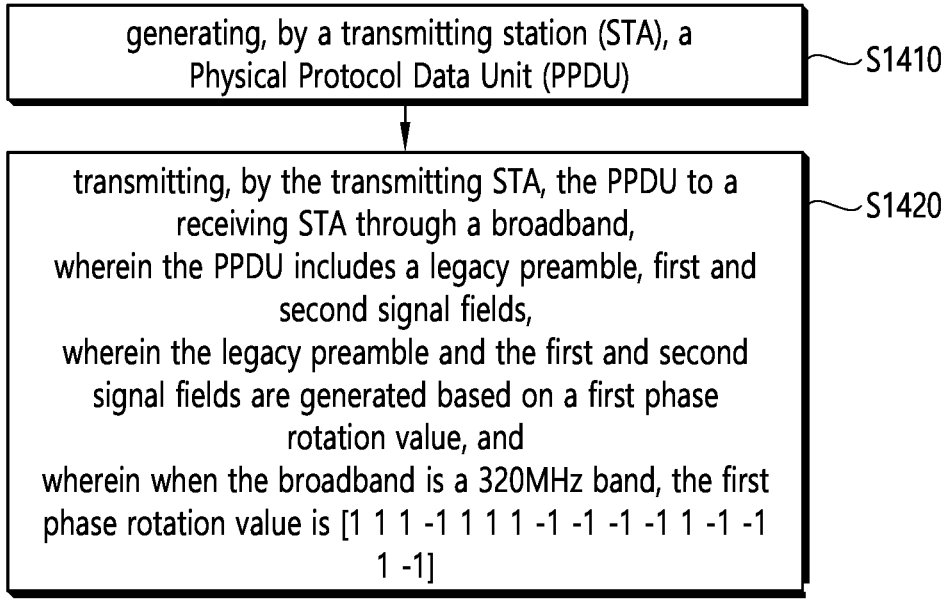

generating, by a transmitting station (STA), a
Physical Protocol Data Unit (PPDU)                    ⌐S1410 transmitting, by the transmitting STA, the PPDU to a
receiving STA through a broadband,                    ⌐S1420
wherein the PPDU includes a legacy preamble, first and
second signal fields,
wherein the legacy preamble and the first and second
signal fields are generated based on a first phase
rotation value, and
wherein when the broadband is a 320MHz band, the first
phase rotation value is [1 1 1 -1 1 1 1 -1 -1 -1 -1 1 -1 -1
1 -1]

FIG. 15

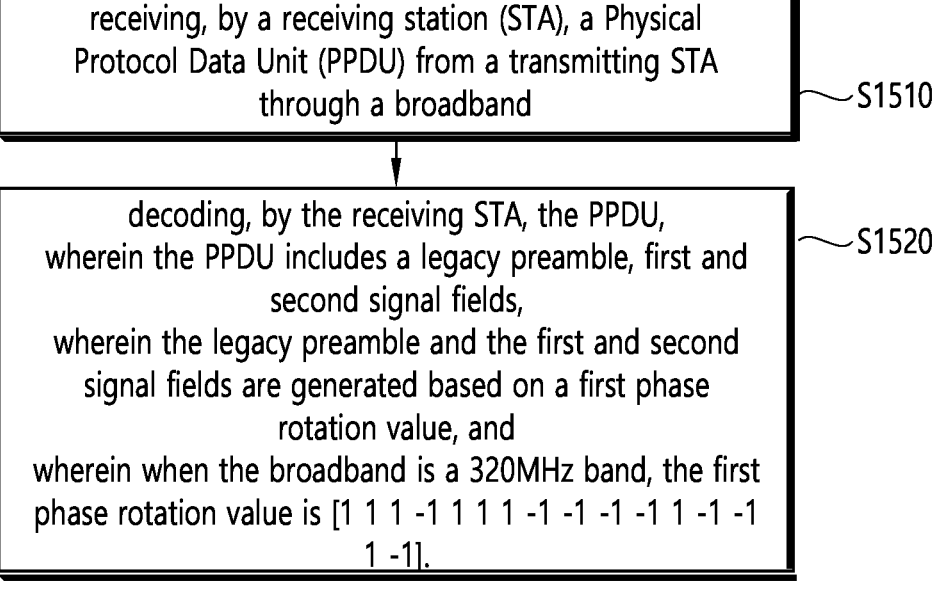

receiving, by a receiving station (STA), a Physical Protocol Data Unit (PPDU) from a transmitting STA through a broadband          ~S1510 decoding, by the receiving STA, the PPDU, wherein the PPDU includes a legacy preamble, first and second signal fields, wherein the legacy preamble and the first and second signal fields are generated based on a first phase rotation value, and wherein when the broadband is a 320MHz band, the first phase rotation value is [1 1 1 -1 1 1 1 -1 -1 -1 -1 1 -1 -1 1 -1].          ~S1520

METHOD AND DEVICE FOR APPLYING OPTIMIZED PHASE ROTATION TO BROADBAND IN WIRELESS LAN SYSTEM

CROSS-REFERENCE TO RELATED APPLICATIONS

This application is the National Stage filing under 35 U.S.C. § 371 of International Application No. PCT/KR2021/005780, filed on May 10, 2021, which claims the benefit of Korean Patent Application No. 10-2020-0060790, filed on May 21, 2020 the contents of which are all hereby incorporated by reference herein in their entirety.

TECHNICAL FIELD

The present specification relates to a method for receiving a PPDU through a broadband in a wireless local area network (WLAN) system and, most particularly, to a method and apparatus for obtaining a PAPR optimized for L-STF or L-LTF by applying a phase rotation optimized for a broadband.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In a new WLAN standard, an increased number of spatial streams may be used. In this case, in order to properly use the increased number of spatial streams, a signaling technique in the WLAN system may need to be improved.

SUMMARY

The present specification proposes a method and apparatus for applying a phase rotation optimized for a broadband in a WLAN system.

An example of the present specification proposes a method for receiving a PPDU through a broadband.

The present embodiment may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment proposes a method and apparatus for configuring a phase rotation value applied capable of obtaining an optimized PAPR in L-STF or L-LTF in consideration of limited preamble puncturing when transmitting a PPDU through a broadband.

A receiving station (STA) receives a Physical Protocol Data Unit (PPDU) from a transmitting STA through a broadband.

The receiving STA decodes the PPDU.

The PPDU includes a legacy preamble and first and second signal fields. The legacy preamble may include a Legacy-Short Training Field (L-STF) and a Legacy-Long Training Field (L-LTF). The first signal field may be a Universal-Signal (U-SIG), and the second signal field may be an Extremely High Throughput-Signal (EHT-SIG). The PPDU may further include an EHT-STF, an EHT-LTF and a data field.

The legacy preamble and the first and second signal fields are generated based on a first phase rotation value. That is, the phase rotation may be applied from the legacy preamble to the EHT-SIG.

When the broadband is a 320 MHz band, the first phase rotation value is [1 1 1 −1 1 1 1 −1 −1 −1 −1 1 −1 −1 1 −1]. This embodiment proposes a phase rotation value obtained by optimizing PAPR in L-STF or L-LTF using the full search method for the broadband. That is, the first phase rotation value is the most optimized phase rotation value in terms of PAPR by performing a full search for the 320 MHz band. In addition, the first phase rotation value is configured of only binary element 1 or −1, and as much as the first phase rotation value is configured using only the binary element, there is an effect that the implementation complexity of the phase rotation value is low.

According to the embodiment proposed in this specification, by proposing a phase rotation value optimized for a broadband in a limited preamble puncturing situation, there is a new effect that PPDU transmission is possible with high power by lowering the PAPR of L-STF and L-LTF. Accordingly, there is an effect that the transmission range of the PPDU is increased and the overall performance is improved.

BRIEF DESCRIPTION OF THE DRAWINGS

FIG. 4 illustrates an example of a PPDU used in an IEEE standard.

FIG. 7 illustrates a layout of RUs used in a band of 80 MHz.

FIG. 10 illustrates an example of a PPDU used in the present specification.

FIG. 14 is a flow diagram illustrating a procedure for a transmitting STA to transmit a PPDU according to the present embodiment.

3

Figure 1:
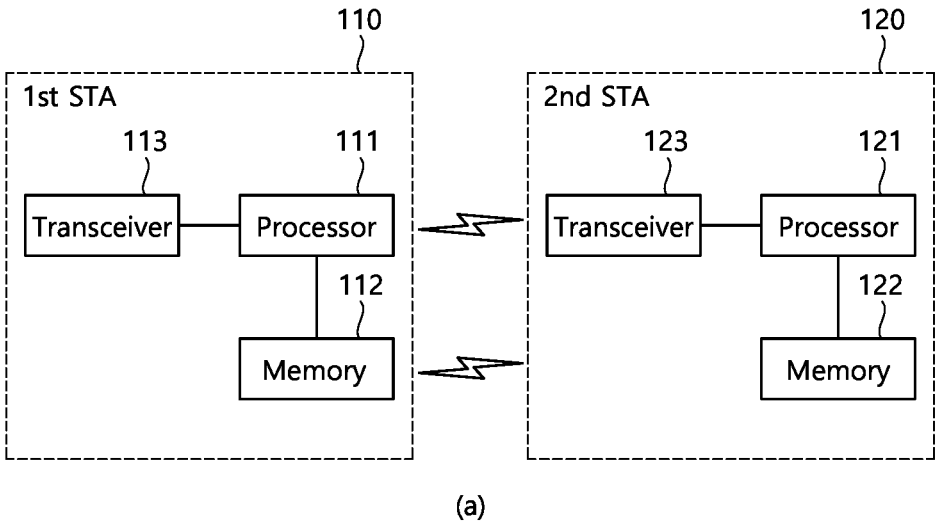
FIG. 1 shows an example of a transmitting apparatus and/or receiving apparatus of the present specification.
Figure 1:
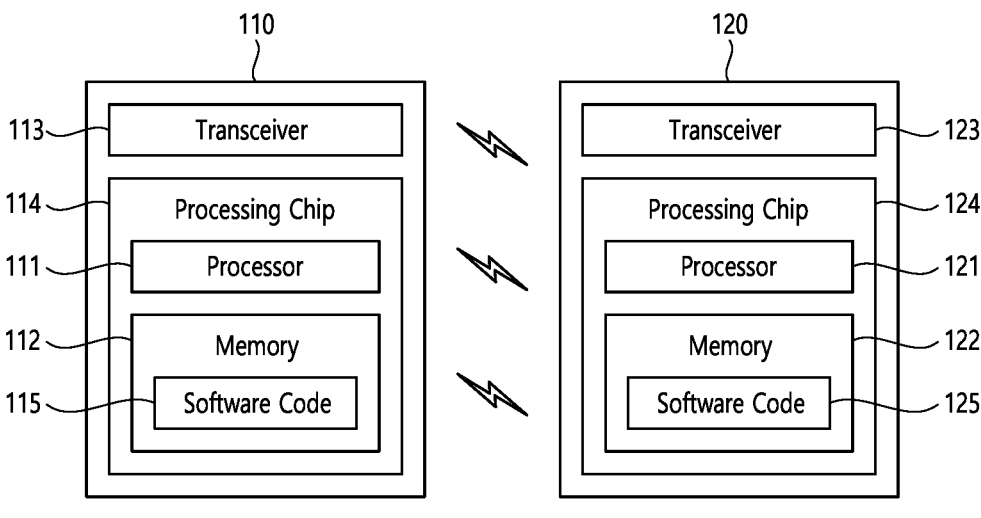

FIG. 15 is a flow diagram illustrating a procedure for a receiving STA to receive a PPDU according to the present embodiment.

DETAILED DESCRIPTION

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
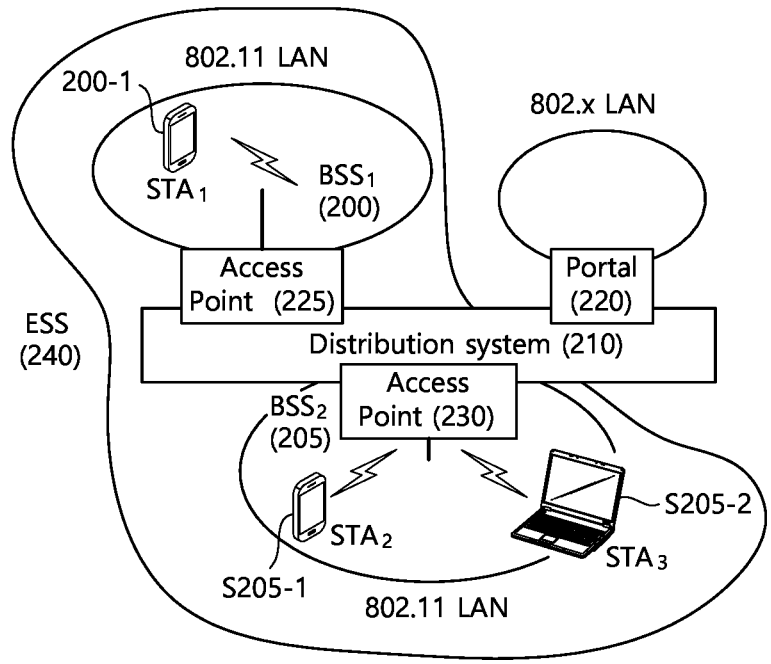
FIG. 2 is a conceptual view illustrating the structure of a wireless local area network (WLAN).
Figure 2:
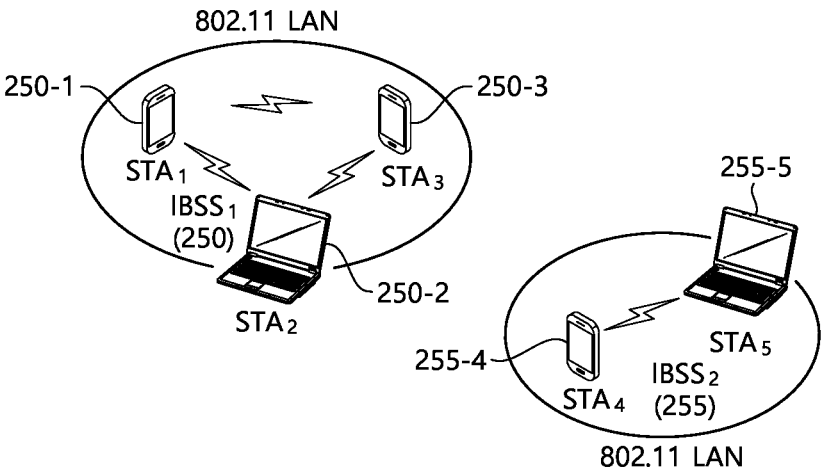

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
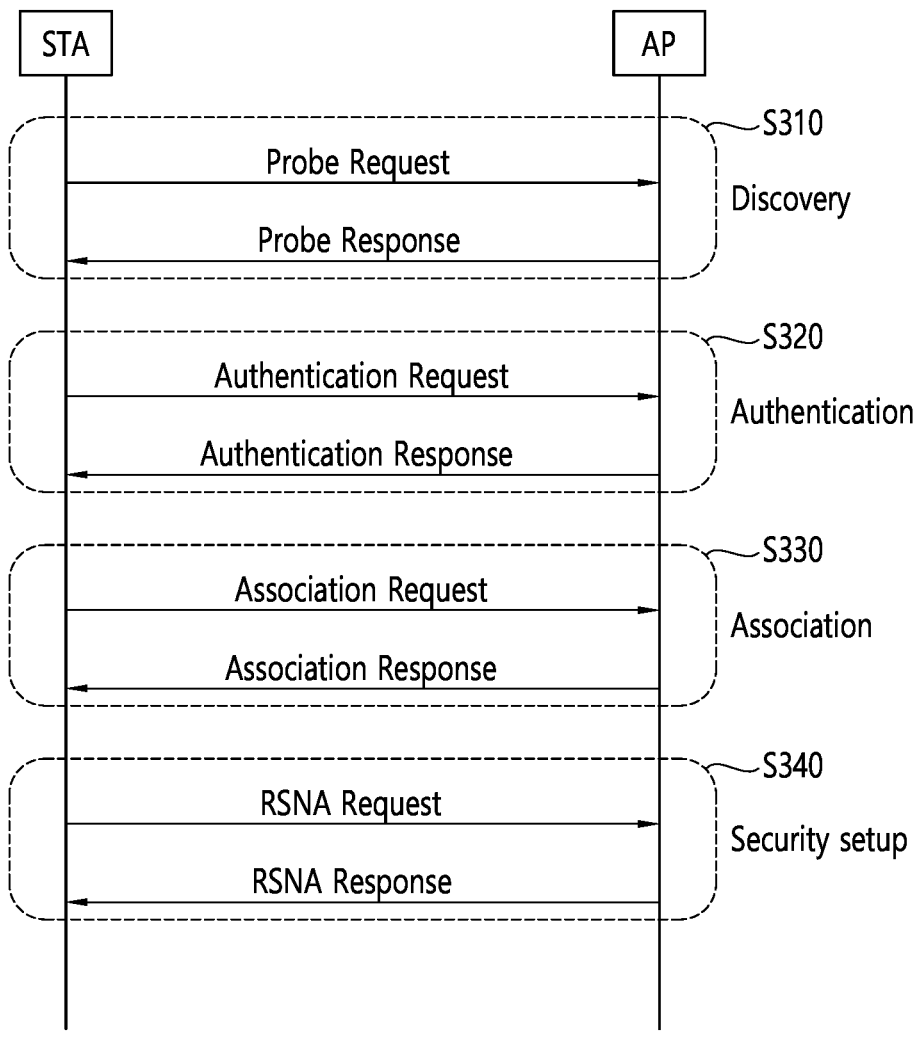
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
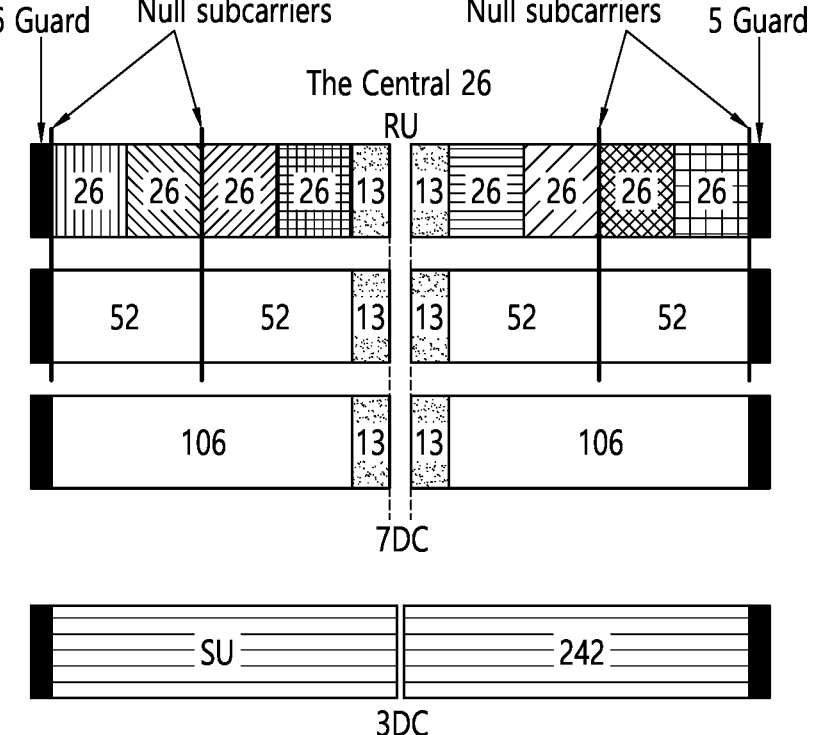
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
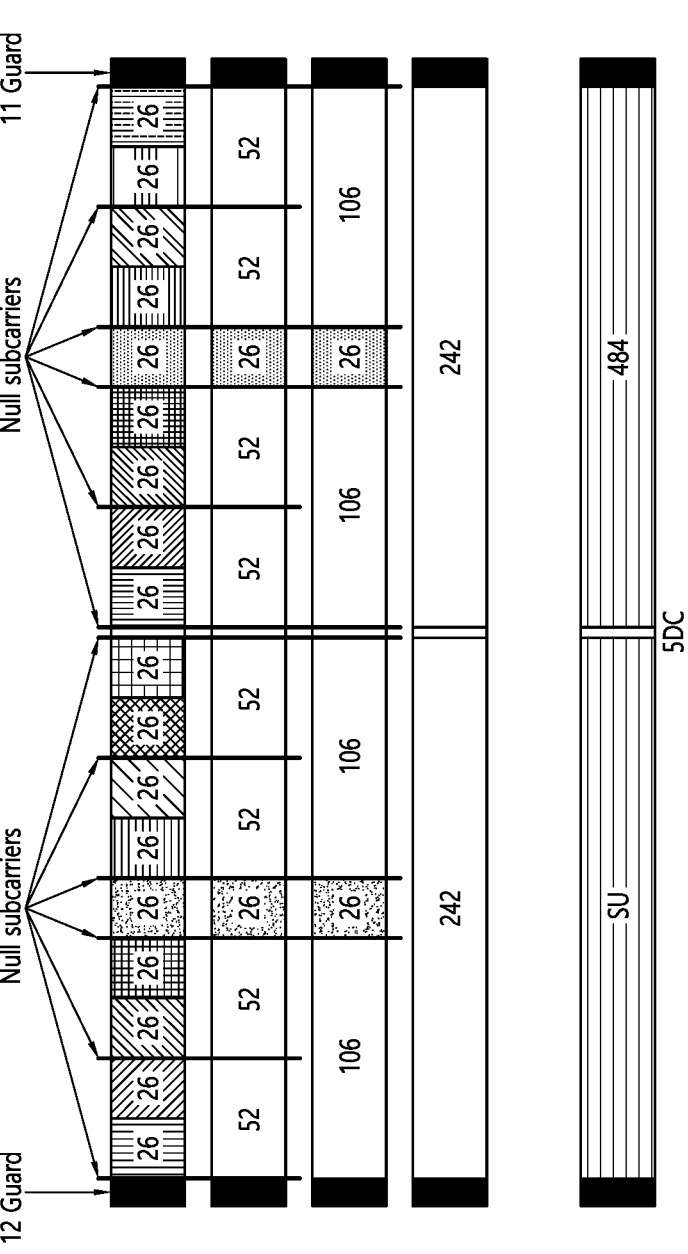
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
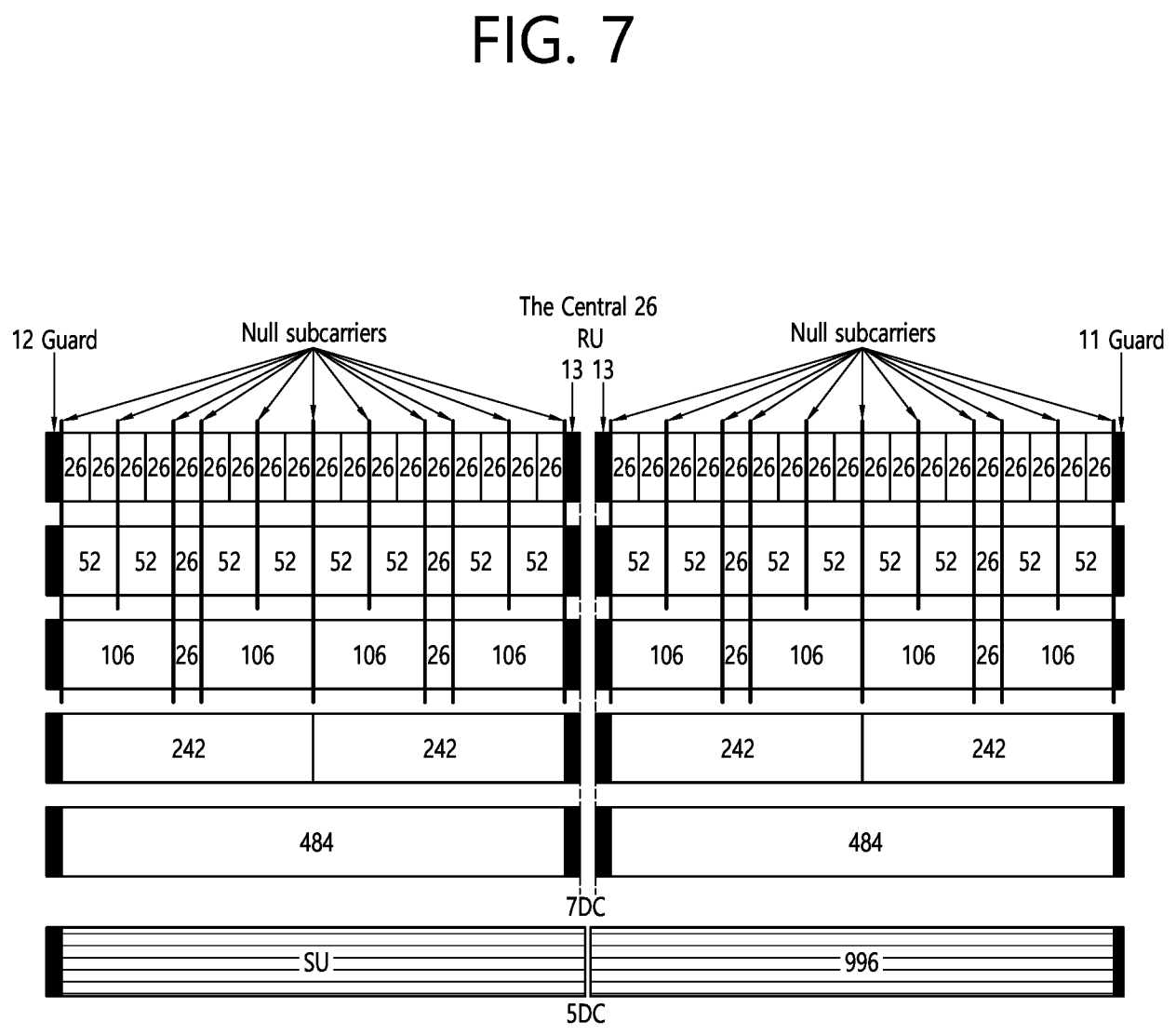

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
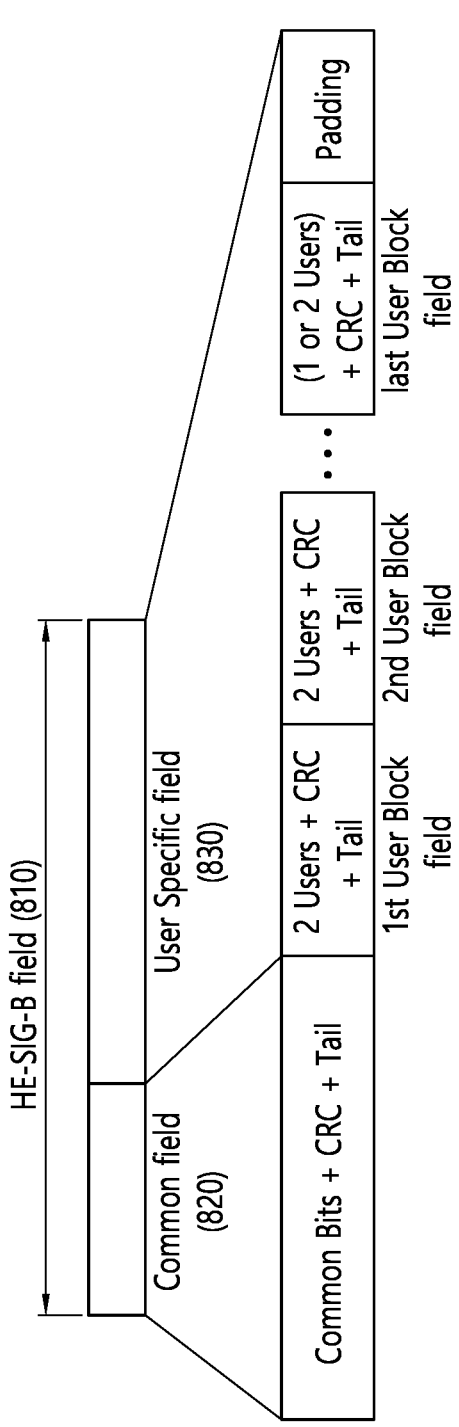
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

12

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| $01000y_2y_1y_0$ | | 106 | | | 26 | 26 | 26 | 26 | 26 | 8 |
| $01001y_2y_1y_0$ | | 106 | | | 26 | 26 | 26 | 52 | | 8 |

"$01000y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "$01000y_2y_1y_0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
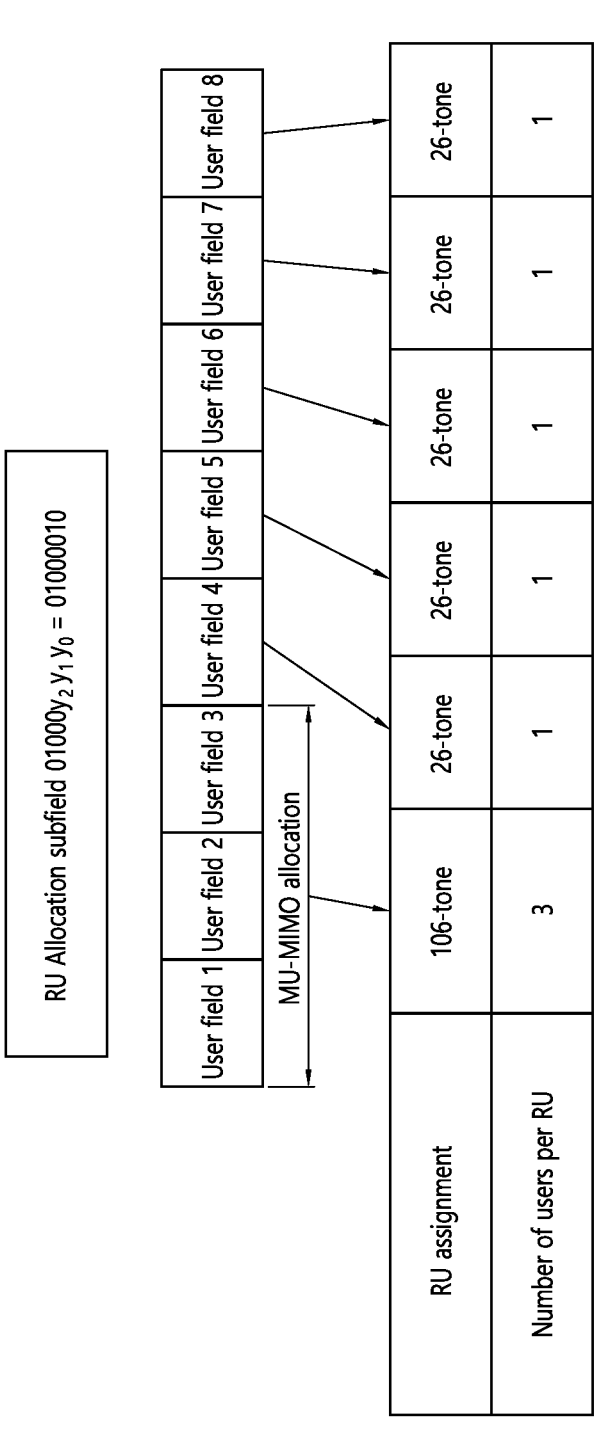
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Hereinafter, a PPDU transmitted/received in a STA of the present specification will be described.

Figure 10:
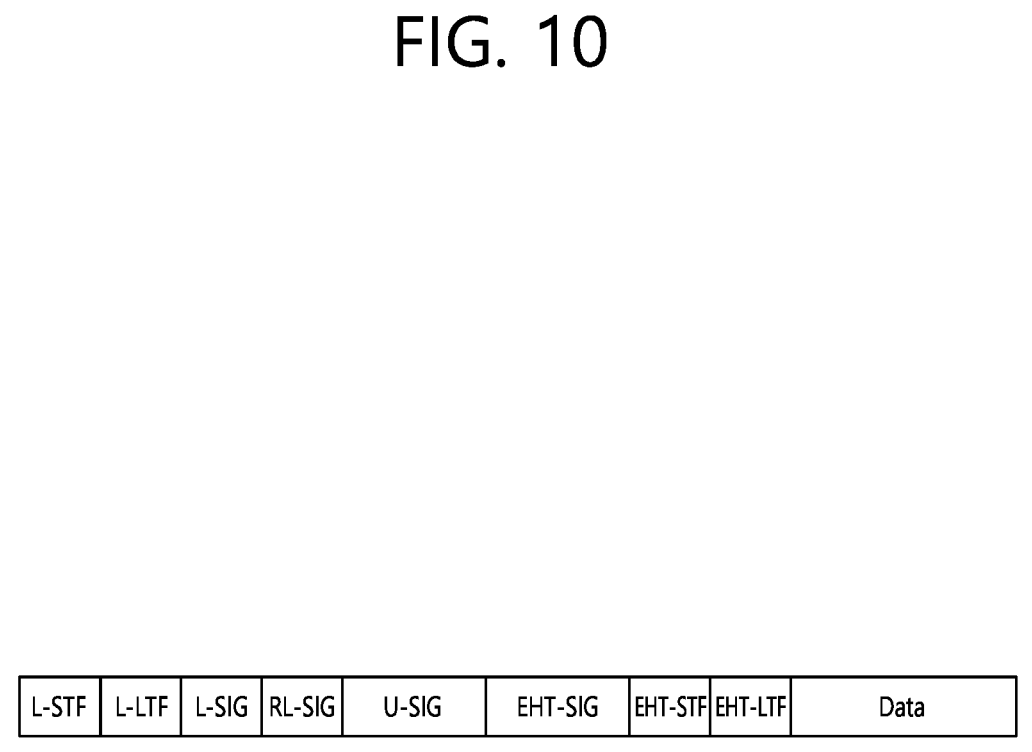

FIG. 10 illustrates an example of a PPDU used in the present specification.

The PPDU of FIG. 10 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 10 may indicate the entirety or part of a PPDU type used in the EHT system. For example, the example of FIG. 10 may be used for both of a single-user (SU) mode and a multi-user (MU) mode. In other words, the PPDU of FIG. 10 may be a PPDU for one receiving STA or a plurality of receiving STAs. When the PPDU of FIG. 10 is used for a trigger-based (TB) mode, the EHT-SIG of FIG. 10 may be omitted. In other words, an STA which has received a trigger frame for uplink-MU (UL-MU) may transmit the PPDU in which the EHT-SIG is omitted in the example of FIG. 10.

In FIG. 10, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 10 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 10, the L-LTE and the L-STF may be the same as those in the conventional fields.

The L-SIG field of FIG. 10 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 10. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 10. The preamble puncturing implies that puncturing is applied to part (e.g., a secondary 20 MHz band) of the full band. For example, when an 80 MHz PPDU is transmitted, an STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 10 may include control information for the receiving STA. The EHT-SIG may be transmitted through at least one symbol, and one symbol may have a length of 4 μs. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

A mode in which the common field of the EHT-SIG is omitted may be supported. The mode in the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of consecutive tones, and a second modulation scheme may be applied to the remaining half of the consecutive tones. That is, a transmitting STA may use the first modulation scheme to modulate specific control information through a first symbol and allocate it to half of the consecutive tones, and may use the second modulation scheme to modulate the same control information by using a second symbol and allocate it to the remaining half of the consecutive tones. As described above, information (e.g., a 1-bit field) regarding whether the DCM scheme is applied to the EHT-SIG may be included in the U-SIG. An HE-STF of FIG. 10 may be used for improving automatic gain control estimation in a multiple input multiple output (MIMO) environment or an OFDMA environment. An HE-LTF of FIG. 10 may be used for estimating a channel in the MIMO environment or the OFDMA environment.

Information related to a type of STF and/or LTF (information related to a GI applied to LTF is also included) may be included in a SIG-A field and/or SIG-B field or the like of FIG. 10.

A PPDU (e.g., EHT-PPDU) of FIG. 10 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 10 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 10. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 10. The PPDU of FIG. 10 may be used to transmit/receive frames of various types. For example, the PPDU of FIG. 10 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 10 may be used for a management frame. An example of the management frame may include a beacon frame, a (re-)association request frame, a (re-)association response frame, a probe request frame, and a probe response frame. For example, the PPDU of FIG. 10 may be used for a data frame. For example, the PPDU of FIG. 10 may be used to simultaneously transmit at least two or more of the control frames, the management frame, and the data frame.

Figure 11:
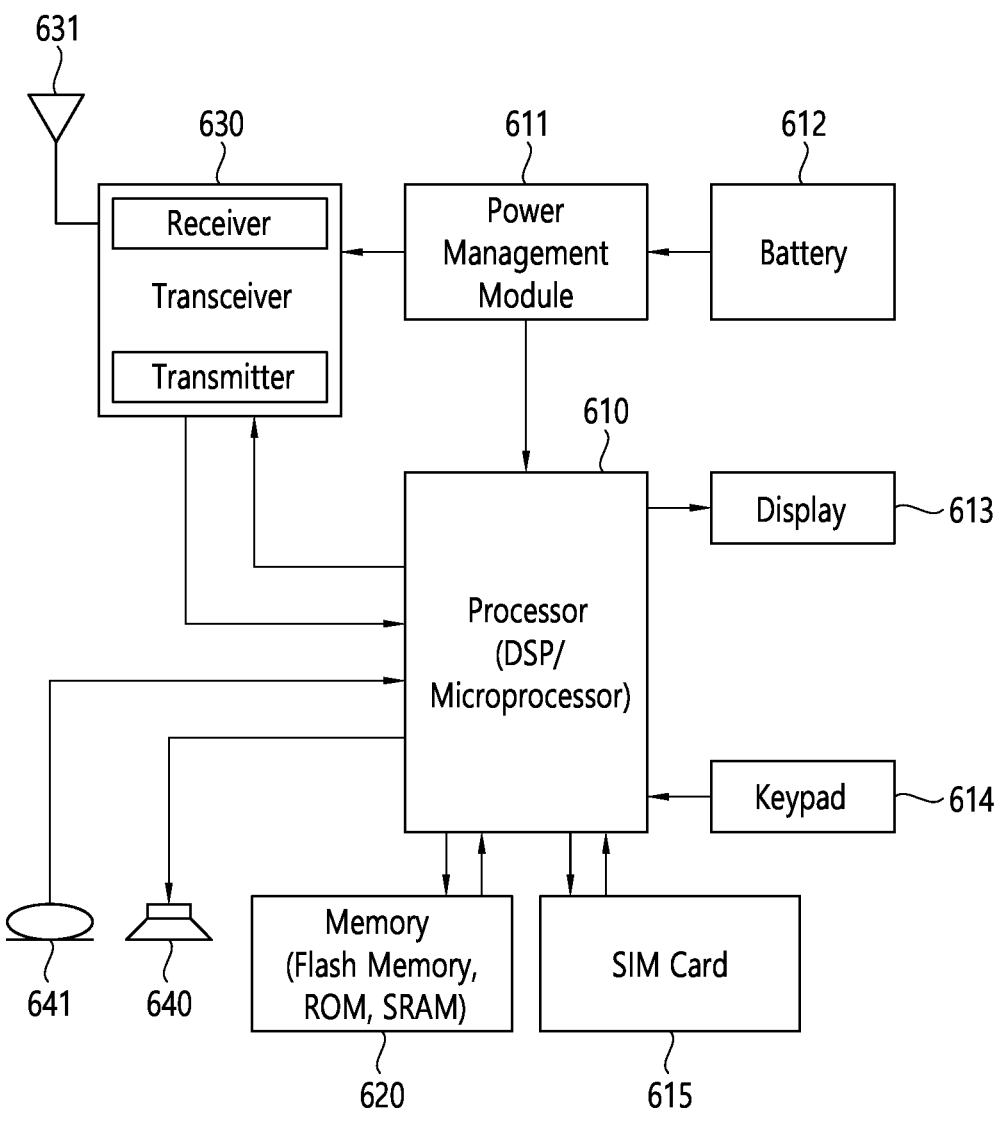
FIG. 11 illustrates an example of a modified transmission device and/or receiving device of the present specification.

FIG. 11 illustrates an example of a modified transmission device and/or receiving device of the present specification.

Each device/STA of the sub-figure (a)/(b) of FIG. 1 may be modified as shown in FIG. 11. A transceiver 630 of FIG. 11 may be identical to the transceivers 113 and 123 of FIG. 1. The transceiver 630 of FIG. 11 may include a receiver and a transmitter.

A processor 610 of FIG. 11 may be identical to the processors 111 and 121 of FIG. 1. Alternatively, the processor 610 of FIG. 11 may be identical to the processing chips 114 and 124 of FIG. 1.

A memory 620 of FIG. 11 may be identical to the memories 112 and 122 of FIG. 1. Alternatively, the memory 620 of FIG. 11 may be a separate external memory different from the memories 112 and 122 of FIG. 1.

Referring to FIG. 11, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 11, a speaker 640 may output a result related to a sound processed by the processor 610. A microphone 641 may receive an input related to a sound to be used by the processor 610.

1. Tone Plan in 802.11Ax WLAN System and Phase Rotation

In the present specification, a tone plan relates to a rule for determining a size of a resource unit (RU) and/or a location of the RU. Hereinafter, a PPDU based on the IEEE 802.11ax standard, that is, a tone plan applied to an HE PPDU, will be described. In other words, hereinafter, the RU size and RU location applied to the HE PPDU are described, and control information related to the RU applied to the HE PPDU is described.

In the present specification, control information related to an RU (or control information related to a tone plan) may include a size and location of the RU, information of a user STA allocated to a specific RU, a frequency bandwidth for a PPDU in which the RU is included, and/or control information on a modulation scheme applied to the specific RU. The control information related to the RU may be included in an SIG field. For example, in the IEEE 802.11ax standard, the control information related to the RU is included in an HE-SIG-B field. That is, in a process of generating a TX PPDU, a transmitting STA may allow the control information on the RU included in the PPDU to be included in the HE-SIG-B field. In addition, a receiving STA may receive an HE-SIG-B included in an RX PPDU and obtain control information included in the HE-SIG-B, so as to determine whether there is an RU allocated to the receiving STA and decode the allocated RU, based on the HE-SIG-B.

In the IEEE 802.11ax standard, HE-STF, HE-LTF, and data fields may be configured in unit of RUs. That is, when a first RU for a first receiving STA is configured, STF/LTF/data fields for the first receiving STA may be transmitted/received through the first RU.

In the IEEE 802.11ax standard, a PPDU (i.e., SU PPDU) for one receiving STA and a PPDU (i.e., MU PPDU) for a plurality of receiving STAs are separately defined, and respective tone plans are separately defined. Specific details will be described below.

The RU defined in 11ax may include a plurality of subcarriers. For example, when the RU includes N subcarriers, it may be expressed by an N-tone RU or N RUs. A location of a specific RU may be expressed by a subcarrier index. The subcarrier index may be defined in unit of a subcarrier frequency spacing. In the 11ax standard, the subcarrier frequency spacing is 312.5 kHz or 78.125 kHz, and the subcarrier frequency spacing for the RU is 78.125 kHz. That is, a subcarrier index +1 for the RU may mean a location which is more increased by 78.125 kHz than a DC tone, and a subcarrier index −1 for the RU may mean a location which is more decreased by 78.125 kHz than the DC tone. For example, when the location of the specific RU is expressed by [−121:−96], the RU may be located in a region from a subcarrier index −121 to a subcarrier index −96. As a result, the RU may include 26 subcarriers.

The N-tone RU may include a pre-set pilot tone.

In what follows, a phase rotation value will be described. $Y_{k,BW}$ is used for representing phase rotation of a tone. $Y_{k,BW}$ for each bandwidth is determined as follows using TXVECTOR parameter CH_BANDWIDTH.

| CH_BANDWIDTH | $Y_{k,BW}$ |
| --- | --- |
| CBW20 | $Y_{k,20}$ |
| CBW40 | $Y_{k,40}$ |
| CBW80 | $Y_{k,80}$ |
| CBW160 | $Y_{k,160}$ |
| CBW80 + 80 | $Y_{k,80}$ per frequency segment |

The value of $Y_{k,BW}$ for each bandwidth is as follows.

For a 20 MHz PPDU transmission, $$Y_{k,20}=1 \qquad (21\text{-}14)$$

For a 40 MHz PPDU transmission, $$\gamma_{k,40} = \begin{cases} 1, k < 0 \\ j, k \ge 0 \end{cases} \qquad (21\text{-}15)$$

For an 80 MHz PPDU transmission, $$\Upsilon_{k,80} = \begin{cases} 1, & k < -64 \\ -1, & k \ge -64 \end{cases} \qquad (21\text{-}16)$$

For an 80+80 MHz PPDU transmission, each 80 MHz frequency segment shall use the phase rotation for 80 MHz PPDU transmissions as defined in Equation (21-16).

For a 160 MHz PPDU transmission, $$\gamma_{k,160} = \begin{cases} 1, k < -192 \\ -1, -192 \le k < 0 \\ 1, 0 \le k < 64 \\ -1, 64 \le k \end{cases} \qquad (21\text{-}17)$$

Since the phase rotation value is defined in units of 20 MHz bands, the phase rotation value used for transmission of a 80 MHz PPDU is [1, −1, −1, −1], and the phase rotation value used for transmission of a 80+80 MHz or 160 MHz PPDU is [1, −1, −1, −1, 1, −1, −1, −1].

2. Embodiment Applicable to the Present Disclosure

The WLAN 802.11 system considers transmission of an increased stream using a band wider than that of the existing 11ax or more antennas to increase the peak throughput. The present disclosure also considers a method of using aggregation of various bands and various preamble puncturing patterns.

This specification considers the case of transmitting the PPDU using a broadband (in particular, 320 MHz), and at this time, proposes a phase rotation applied to the legacy preamble and U-SIG, EHT-SIG part (or up to the field just before EHT-STF). In particular, this specification proposes unified phase rotation optimized at 320 MHz and 240 MHz in consideration of the limited preamble puncturing situation.

A representative structure of an 802.11be PPDU (EHT PPDU) is shown in FIG. 10. The U-SIG consists of a version independent field and a version dependent field. In addition, U-SIG consists of two symbols, two symbols are jointly encoded, and each 20 MHz consists of 52 data tones and 4 pilot tones. Also, U-SIG is modulated in the same way as HE-SIG-A. EHT-SIG can be divided into common field and user specific field and can be encoded as variable MCS. Information for allocating RUs may be carried in the common field and the user specific field.

When the transmitter transmits the PPDU, phase rotation may be applied to lower the Peak-to-Average Power Ratio (PAPR). Phase rotation may be applied to a field from L-preamble to just before EHT-STF, and a phase rotation value may be defined in units of 20 MHz.

In 802.11be, the bandwidth of contiguous 240/320 MHz and non-contiguous 160+80/80+160/160+160 MHz can be used in addition to the existing 20/40/80/160/80+80 MHz bandwidth. In this specification, phase rotation of 320/160+160 MHz is proposed, and when the full band allocation situation and the corresponding preamble puncturing situation are simultaneously considered in consideration of the limited preamble puncturing situation, one unified phase rotation that can lower the PAPR as much as possible is proposed.

Phase rotation may be proposed based on a contiguous 320 MHz, and phase rotation in non-contiguous 160+160 MHz may be proposed as described below. The phase rotation of the 160 MHz part corresponding to the lower frequency among contiguous 320 MHz is applied as it is to the 160 MHz phase rotation corresponding to the lower frequency among non-contiguous 160+160 MHz, and the phase rotation of the 160 MHz part corresponding to the high frequency among contiguous 320 MHz is applied as it is to the 160 MHz phase rotation corresponding to the high frequency among non-contiguous 160+160 MHz.

Subcarrier indexes of the contiguous 320 MHz are −512-511. And, various phase rotation values that are proposed below have the following format.

[a b c d e f g h i j k l m n o p]

This means a phase rotation being applied to each 20 MHz starting from a 20 MHz of a low frequency to a 20 MHz of a high frequency. In other words, a is a phase rotation being applied to subcarriers of −512-−449, b is a phase rotation being applied to subcarriers of −448-−385, c is a phase rotation being applied to subcarriers of −384-−321, d is a phase rotation being applied to subcarriers of −320-−257, e is a phase rotation being applied to subcarriers of −256-−193, f is a phase rotation being applied to subcarriers of −192-−129, g is a phase rotation being applied to subcarriers of −128-−65, h is a phase rotation being applied to subcarriers of −64-−1, i is a phase rotation being applied to subcarriers of 0~63, j is a phase rotation being applied to subcarriers of 64~127, k is a phase rotation being applied to subcarriers of 128~191, l is a phase rotation being applied to subcarriers of 192~255, m is a phase rotation being applied to subcarriers of 256~319, n is a phase rotation being applied to subcarriers of 320-383, o is a phase rotation being applied to subcarriers of 384~447, and p is a phase rotation being applied to subcarriers of 448~511.

In addition, this specification considers various RF capabilities such as 160 MHz and 320 MHz.

Calculation of PAPR used L-STF and L-LTF, and assumed 4 times of Inverse Fast Fourier Transform (IFFT)/Inverse Discrete Fourier Transform (IDFT).

The same PAPR can also be obtained for phase rotations generated by multiplying or reversing the order of additionally specific values to all of the phase rotation values proposed below.

2.1 Limited Preamble Puncturing Case

In addition to full band allocation, limited preamble puncturing is considered as follows.

Full band allocation: [OOOO OOOO OOOO OOOO]
Preamble Puncturing

[XXOO OOOO OOOO OOOO]
 [OOXX OOOO OOOO OOOO]
 [OOOO XXOO OOOO OOOO]
 [OOOO OOXX OOOO OOOO]
 [OOOO OOOO XXOO OOOO]
 [OOOO OOOO OOXX OOOO]
 [OOOO OOOO OOOO XXOO]
 [OOOO OOOO OOOO OOXX]
 [XXXX OOOO OOOO OOOO]
 [OOOO XXXX OOOO OOOO]
 [OOOO OOOO XXXX OOOO]
 [OOOO OOOO OOOO XXXX]

In the above, O or X means that a specific 20 MHz channel is not punctured or punctured, and is expressed in order from a low frequency 20 MHz channel to a high 20 MHz channel.

In addition, to propose unified phase rotation at 320 MHz and 240 MHz, preamble puncturing of 240 MHz is also considered as follows.

[XXXX XXOO OOOO OOOO]
 [XXXX OOXX OOOO OOOO]
 [XXXX OOOO XXOO OOOO]
 [XXXX OOOO OOXX OOOO]
 [XXXX OOOO OOOO XXOO]
 [XXXX OOOO OOOO OOXX]
 [XXXX XXXX OOOO OOOO]
 [XXXX OOOO XXXX OOOO]
 [XXXX OOOO OOOO XXXX]
 [XXOO XXXX OOOO OOOO]
 [OOXX XXXX OOOO OOOO]
 [OOOO XXXX XXOO OOOO]
 [OOOO XXXX OOXX OOOO]
 [OOOO XXXX OOOO XXOO]
 [OOOO XXXX OOOO OOXX]
 [XXXX XXXX OOOO OOOO]
 [OOOO XXXX XXXX OOOO]
 [OOOO XXXX OOOO XXXX]
 [XXOO OOOO XXXX OOOO]
 [OOXX OOOO XXXX OOOO]
 [OOOO XXOO XXXX OOOO]
 [OOOO OOXX XXXX OOOO]
 [OOOO OOOO XXXX XXOO]
 [OOOO OOOO XXXX OOXX]
 [XXXX OOOO XXXX OOOO]
 [OOOO XXXX XXXX OOOO]
 [OOOO OOOO XXXX XXXX]
 [XXOO OOOO OOOO XXXX]
 [OOXX OOOO OOOO XXXX]
 [OOOO XXOO OOOO XXXX]
 [OOOO OOXX OOOO XXXX]
 [OOOO OOOO XXOO XXXX]
 [OOOO OOOO OOXX XXXX]
 [XXXX OOOO OOOO XXX]
 [OOOO XXXX OOOO XXXX]
 [OOOO OOOO XXXX XXXX]

24

The preamble puncturing pattern may be indicated by the Punctured Channel Information field of the U-SIG (U-SIG-2). The Punctured Channel Information field consists of 5 bits.

Specifically, when the PPDU is transmitted in the non-OFDMA scheme, 5 bits of the Punctured Channel Information field may be set as items in the table below to signal the non-OFDMA puncturing pattern of the entire PPDU bandwidth. The table below defines the preamble puncturing pattern in the non-OFDMA scheme for each PPDU bandwidth. A value not defined in the Punctured Channel Information field is valid.

| PPDU bandwidth | Cases | Puncturing pattern | Field value |
|---|---|---|---|
| 20/40 MHz | No puncturing | [1 1 1 1] | 0 |
| 80 MHz | No puncturing | [1 1 1 1] | 0 |
| | 20 MHz puncturing | [x 1 1 1] | 1 |
| | | [1 x 1 1] | 2 |
| | | [1 1 x 1] | 3 |
| | | [1 1 1 x] | 4 |
| 160 MHz | No puncturing | [1 1 1 1 1 1 1 1] | 0 |
| | 20 MHz puncturing | [x 1 1 1 1 1 1 1] | 1 |
| | | [1 x 1 1 1 1 1 1] | 2 |
| | | [1 1 x 1 1 1 1 1] | 3 |
| | | [1 1 1 x 1 1 1 1] | 4 |
| | | [1 1 1 1 x 1 1 1] | 5 |
| | | [1 1 1 1 1 x 1 1] | 6 |
| | | [1 1 1 1 1 1 x 1] | 7 |
| | | [1 1 1 1 1 1 1 x] | 8 |
| | 40 MHz puncturing | [x x 1 1 1 1 1 1] | 9 |
| | | [1 1 x x 1 1 1 1] | 10 |
| | | [1 1 1 1 x x 1 1] | 11 |
| | | [1 1 1 1 1 1 x x] | 12 |
| 320 MHz | No puncturing | [1 1 1 1 1 1 1 1] | 0 |
| | 40 MHz puncturing | [x 1 1 1 1 1 1 1] | 1 |
| | | [1 x 1 1 1 1 1 1] | 2 |
| | | [1 1 x 1 1 1 1 1] | 3 |
| | | [1 1 1 x 1 1 1 1] | 4 |
| | | [1 1 1 1 x 1 1 1] | 5 |
| | | [1 1 1 1 1 x 1 1] | 6 |
| | | [1 1 1 1 1 1 x 1] | 7 |
| | | [1 1 1 1 1 1 1 x] | 8 |
| | 80 MHz puncturing | [x x 1 1 1 1 1 1] | 9 |
| | | [1 1 x x 1 1 1 1] | 10 |
| | | [1 1 1 1 x x 1 1] | 11 |
| | | [1 1 1 1 1 1 x x] | 12 |

As another example, when the PPDU is transmitted in the OFDMA scheme, first, if the bandwidth is determined as 80/160/320 MHz based on the bandwidth (BW) field of U-SIG-1, a bitmap composed of 4 bits in the Punctured Channel Information field (The last 1 bit can be ignored) may indicate whether to puncture a 20 MHz channel for each 80 MHz segment. In the 4-bit bitmap, in the order of the lowest bit to the highest bit, the channel may be applied from the lowest frequency 20 MHz channel to the highest frequency 20 MHz channel. When each bit of the 4-bit bitmap indicates 0, the corresponding 20 MHz channel is punctured, and when each bit of the 4-bit bitmap indicates 1, the corresponding 20 MHz channel is not punctured. The allowed puncturing patterns for the 80 MHz segment are: 0111, 1011, 1101, 1110, 0011, 1100 and 1001. Other field values are valid in addition to the above allowed puncturing patterns. The field value for the puncturing pattern may be different for different 80 MHz.

In addition, a transmitter modulation accuracy (EVM) test will be described. This is related to RF capability, which will be described later.

The transmitter modulation accuracy test procedure for the occupied subcarrier of the PPDU is as follows.

a) The start of the PPDU shall be detected.

b) The test device should detect the transition from L-STF to L-LTF and set precise timing.

c) The test rig shall estimate a coarse and fine frequency offset.

d) The symbols of the PPDU shall be reverse rotated according to the estimated frequency offset. Sampling offset drift must also be compensated.

e) For each EHT-LTF symbol, the test device converts the symbol into a subcarrier received value, estimates the phase from the pilot subcarrier, and reverses the subcarrier value according to the estimated phase. For a 320 MHz PPDU, the phase estimation is robust to uncorrelated phase noise in the lower and upper 160 MHz frequency portions of the PPDU. In this case, if the lower and upper 160 MHz channels have uncorrelated phase noise, the 320 MHz PPDU may be transmitted through two RFs with 160 MHz capability. Alternatively, if the lower and upper 160 MHz channels have correlated phase noise, the 320 MHz PPDU may be transmitted through one RF with 320 MHz capability.

f) The test device estimates complex channel response coefficients for each subcarrier and each transport stream.

g) the test device transforms the symbol into a subcarrier received value for each data OFDM symbol, estimates the phase from the pilot subcarrier, compensates the subcarrier value according to the estimated phase, and groups the results of all receiver chains of each subcarrier as follows. The vector is multiplied by a zero-forcing equalization matrix generated from the estimated channel. For a 320 MHz PPDU, the phase estimate is robust to uncorrelated noise in the lower and upper 160 MHz frequency portions of the PPDU.

h) The test device finds the nearest constellation point for each data-carrying subcarrier in each spatial stream of the RU under test and calculates the Euclidean distance therefrom.

i) The test device calculates the average over the PPDU of RMS of all errors per PPDU.

2.1.1 Considering 320 MHz RF Capability

A PPDU can be transmitted with one 320 MHz capa RF.

In this case, the optimal phase rotation in L-STF and max PAPR values in L-STF/L-LTF are as follows.

[1 1 1 −1 −1 −1 1 −1 −1 −1 1 −1 1 1 −1]

TABLE 3

| L-STF | L-LTF |
|---|---|
| 7.5260 | 8.7033 |

Optimal phase rotation in another L-STF and max PAPR values in L-STF/L-LTF are as follows. [−1 −1 1 −1 1 1 1 −1 1 1 1 1 −1 −1 −1]

TABLE 4

| L-STF | L-LTF |
|---|---|
| 7.5260 | 8.7033 |

The optimal phase rotation in L-LTF and max PAPR values in L-STF/L-LTF are as follows. [1 1 1 −1 1 1 1 −1 1 −1 −1 1 −1 −1 −1 1]

TABLE 5

| L-STF | L-LTF |
|---|---|
| 7.8868 | 8.7033 |

The optimal phase rotation in another L-LTF and max PAPR values in L-STF/L-LTF are as follows. [1 1 1 −1 1 1 1 −1 −1 1 −1 1 1 −1 −1 −1]

TABLE 6

| L-STF | L-LTF |
|---|---|
| 7.9564 | 8.7033 |

The optimal phase rotation in another L-LTF and max PAPR values in L-STF/L-LTF are as follows. [1 1 1 −1 1 1 1 −1 −1 1 −1 −1 1 −1 −1 −1]

TABLE 7

| L-STF | L-LTF |
|---|---|
| 7.7678 | 8.7033 |

The optimal phase rotation in another L-LTF and max PAPR values in L-STF/L-LTF are as follows. [1 1 1 −1 1 1 1 −1 −1 −1 −1 1 −1 −1 1 −1]

TABLE 8

| L-STF | L-LTF |
|---|---|
| 7.5762 | 8.7033 |

The optimal phase rotation in another L-LTF and max PAPR values in L-STF/L-LTF are as follows. [1 1 1 −1 1 1 −1 1 1 −1 −1 −1 1 −1 −1 −1]

TABLE 9

| L-STF | L-LTF |
|---|---|
| 7.7678 | 8.7033 |

The optimal phase rotation in another L-LTF and max PAPR values in L-STF/L-LTF are as follows. [1 1 −1 −1 −1 −1 1 −1 −1 −1 1 1 −1]

TABLE 10

| L-STF | L-LTF |
|---|---|
| 8.1187 | 8.7033 |

The optimal phase rotation in another L-LTF and max PAPR values in L-STF/L-LTF are as follows. [1 1 1 −1 −1 1 −1 1 1 −1 −1 −1 1 −1 −1 −1]

TABLE 11

| L-STF | L-LTF |
|---|---|
| 7.9564 | 8.7033 |

The optimal phase rotation in another L-LTF and max PAPR values in L-STF/L-LTF are as follows. [1 1 1 −1 −1 1 −1 −1 −1 1 1 −1 −1 −1 −1 1]

TABLE 12

| L-STF | L-LTF |
|---|---|
| 7.8844 | 8.7033 |

The optimal phase rotation in another L-LTF and max PAPR values in L-STF/L-LTF are as follows. [1 1 1 −1 −1 −1 −1 1 −1 −1 −1 1 −1 1 1 −1]

TABLE 13

| L-STF | L-LTF |
|---|---|
| 7.5260 | 8.7033 |

The optimal phase rotation in another L-LTF and max PAPR values in L-STF/L-LTF are as follows.
[1 1 −1 1 1 1 −1 −1 −1 −1 1 −1 −1 −1 1]

TABLE 14

| L-STF | L-LTF |
|---|---|
| 7.8868 | 8.7033 |

The optimal phase rotation in another L-LTF and max PAPR values in L-STF/L-LTF are as follows. [1 1 1 −1 1 −1 −1 −1 1 −1 −1 −1 1 1 1 1 −1]

TABLE 15

| L-STF | L-LTF |
|---|---|
| 7.8183 | 8.7033 |

The optimal phase rotation in another L-LTF and max PAPR values in L-STF/L-LTF are as follows. [1 −1 1 1 −1 1 1 1 1 −1 −1 −1 1 −1 −1 −1]

TABLE 16

| L-STF | L-LTF |
|---|---|
| 7.5762 | 8.7033 |

The optimal phase rotation in another L-LTF and max PAPR values in L-STF/L-LTF are as follows. [1 −1 1 1 −1 1 1 1 −1 −1 −1 1 −1 −1 −1 1]

TABLE 17

| L-STF | L-LTF |
|---|---|
| 8.1414 | 8.7033 |

The optimal phase rotation in another L-LTF and max PAPR values in L-STF/L-LTF are as follows. [1 −1 −1 1 1 1 −1 1 1 1 1 −1 1 1 −1 −1 −1]

TABLE 18

| L-STF | L-LTF |
|---|---|
| 8.1187 | 8.7033 |

The optimal phase rotation in another L-LTF and max PAPR values in L-STF/L-LTF are as follows.
[1 −1 −1 1 1 −1 1 1 1 1 −1 −1 −1 −1 1]

TABLE 19

| L-STF | L-LTF |
|---|---|
| 7.8904 | 8.7033 |

The optimal phase rotation in another L-LTF and max PAPR values in L-STF/L-LTF are as follows. [1 −1 −1 1 −1 1 1 1 −1 1 1 1 1 −1 −1 −1]

TABLE 20

| L-STF | L-LTF |
|---|---|
| 7.5260 | 8.7033 |

The optimal phase rotation in another L-LTF and max PAPR values in L-STF/L-LTF are as follows. [1 −1 −1 1 −1 −1 −1 1 −1 −1 −1 1 1 1 1 −1]

TABLE 21

| L-STF | L-LTF |
|---|---|
| 7.9567 | 8.7033 |

The optimal phase rotation in another L-LTF and max PAPR values in L-STF/L-LTF are as follows. [1 −1 −1 −1 1 −1 −1 1 1 1 −1 1 1 1 1 −1]

TABLE 22

| L-STF | L-LTF |
|---|---|
| 7.9401 | 8.7033 |

The optimal phase rotation in another L-LTF and max PAPR values in L-STF/L-LTF are as follows. [1 −1 −1 −1 1 −1 −1 1 −1 1 1 1 −1 1 1 1]

TABLE 23

| L-STF | L-LTF |
|---|---|
| 7.8868 | 8.7033 |

The optimal phase rotation in another L-LTF and max PAPR values in L-STF/L-LTF are as follows.
[1 −1 −1 1 −1 −1 −1 1 1 1 −1 1 1 −1 1]

TABLE 24

| L-STF | L-LTF |
|---|---|
| 8.1414 | 8.7033 |

The optimal phase rotation in another L-LTF and max PAPR values in L-STF/L-LTF are as follows. [1 −1 −1 −1 1 1 −1 −1 −1 −1 1 1 1 1 −1 1 1]

TABLE 25

| L-STF | L-LTF |
|---|---|
| 7.8868 | 8.7033 |

The optimal phase rotation in another L-LTF and max PAPR values in L-STF/L-LTF are as follows. [1 −1 −1 −1 −1 1 1 1 1 −1 1 1 1 −1 −1 1]

TABLE 26

| L-STF | L-LTF |
|---|---|
| 7.8904 | 8.7033 |

The optimal phase rotation in another L-LTF and max PAPR values in L-STF/L-LTF are as follows. [1 −1 −1 −1 −1 1 1 1 −1 1 1 1 −1 1 1 −1]

TABLE 27

| L-STF | L-LTF |
|---|---|
| 7.9567 | 8.7033 |

The optimal phase rotation in another L-LTF and max PAPR values in L-STF/L-LTF are as follows. [1 −1 −1 −1 −1 1 1 1 −1 1 1 1 −1 1 −1 −1]

TABLE 28

| L-STF | L-LTF |
|---|---|
| 7.8183 | 8.7033 |

The optimal phase rotation in another L-LTF and max PAPR values in L-STF/L-LTF are as follows. [1 −1 −1 −1 −1 1 1 −1 −1 −1 1 −1 −1 1 1 1 1]

TABLE 29

| L-STF | L-LTF |
|---|---|
| 7.8844 | 8.7033 |

The optimal phase rotation in another L-LTF and max PAPR values in L-STF/L-LTF are as follows. [1 −1 −1 −1 −1 1 −1 −1 −1 1 1 −1 1 1 1 −1]

TABLE 30

| L-STF | L-LTF |
|---|---|
| 7.9401 | 8.7033 |

4.1.2 Considering 160/320 MHz RF Capability PPDU May be Transmitted with Two 160 MHz Capa RFs or One 320 MHz Capa RF.

In this case, the optimal phase rotation in L-STF and max PAPR values in L-STF/L-LTF are as follows.

[1 1 1 −1 −1 −1 −1 1 −1 −1 −1 1 −1 1 1 −1]

TABLE 31

| L-STF | L-LTF |
|---|---|
| 7.5260 | 8.7033 |

The optimal phase rotation in another L-STF and the max PAPR value in L-STF/L-LTF are as follows. [1 −1 −1 1 −1 1 1 1 −1 1 1 1 1 −1 −1 −1]

TABLE 32

| L-STF | L-LTF |
|---|---|
| 7.5260 | 8.7033 |

The optimal phase rotation in another L-LTF and max PAPR values in L-STF/L-LTF are as follows. [1 1 1 −1 1 1 1 −1 1 1 −1 −1 1 −1 −1 −1 1]

TABLE 33

| L-STF | L-LTF |
|---|---|
| 7.8868 | 8.7033 |

The optimal phase rotation in another L-LTF and max PAPR values in L-STF/L-LTF are as follows. [1 1 1 −1 1 1 1 −1 −1 1 −1 −1 1 −1 −1 −1]

TABLE 34

| L-STF | L-LTF |
|---|---|
| 7.7678 | 8.7033 |

The optimal phase rotation in another L-LTF and max PAPR values in L-STF/L-LTF are as follows.

[1 1 1 −1 1 1 1 −1 −1 −1 −1 1 −1 −1 1 1 −1]

TABLE 35

| L-STF | L-LTF |
|---|---|
| 7.5762 | 8.7033 |

The optimal phase rotation in another L-LTF and max PAPR values in L-STF/L-LTF are as follows. [1 1 1 −1 1 1 −1 1 1 −1 −1 −1 1 −1 −1 −1]

TABLE 36

| L-STF | L-LTF |
|---|---|
| 7.7678 | 8.7033 |

The optimal phase rotation in another L-LTF and max PAPR values in L-STF/L-LTF are as follows. [1 1 1 −1 1 −1 −1 −1 −11 −1 −1 −1 1 1 −1]

TABLE 37

| L-STF | L-LTF |
|---|---|
| 8.1187 | 8.7033 |

The optimal phase rotation in another L-LTF and max PAPR values in L-STF/L-LTF are as follows. [1 1 1 −1 −1 1 −1 −1 −1 11 −1 −1 −1 −1 1]

TABLE 38

| L-STF | L-LTF |
|---|---|
| 7.8844 | 8.7033 |

The optimal phase rotation in another L-LTF and max PAPR values in L-STF/L-LTF are as follows. [1 1 1 −1 −1 −1 −1 1 −1 −1 −1 1 −1 1 1 −1]

TABLE 39

| L-STF | L-LTF |
|---|---|
| 7.5260 | 8.7033 |

The optimal phase rotation in another L-LTF and mx PAPR values in L-STF L-LTF are as follows. [1 1 −1 1 1 1 1 −1 −1 −1 −1 1 −1 −1 −1 1]

TABLE 40

| L-STF | L-LTF |
|---|---|
| 7.8868 | 8.7033 |

The optimal phase rotation in another L-LTF and max PAPR values in L-STF/L-LTF are as follows. [1 1 −1 1 −1 −1 −1 1 −1 −1 −1 1 1 1 1 −1]

TABLE 41

| L-STF | L-LTF |
|---|---|
| 7.8183 | 8.7033 |

The optimal phase rotation in another L-LTF and max PAPR values in L-STF/L-LTF are as follows. [1 −1 1 1 −1 1 1 1 1 −1 −1 −1 1 −1 −1 −1]

TABLE 42

| L-STF | L-LTF |
|---|---|
| 7.5762 | 8.7033 |

The optimal phase rotation in another L-LTF and max PAPR values in L-STF/L-LTF are as follows. [1 −1 1 1 −1 1 1 1 −1 −1 −1 1 −1 −1 −1 1]

TABLE 43

| L-STF | L-LTF |
|---|---|
| 8.1414 | 8.7033 |

The optimal phase rotation in another L-LTF and max PAPR values in L-STF/L-LTF are as follows. [1 −1 −1 1 1 1 −1 1 1 1 1 −1 1 1 −1 −1 −1]

TABLE 44

| L-STF | L-LTF |
|---|---|
| 8.1187 | 8.7033 |

The optimal phase rotation in another L-LTF and max PAPR values in L-STF/L-LTF are as follows. [1 −1 −1 1 1 1 −1 1 1 1 1 −1 −1 −1 −1 1]

TABLE 45

| L-STF | L-LTF |
|---|---|
| 7.8904 | 8.7033 |

The optimal phase rotation in another L-LTF and max PAPR values in L-STF/L-LTF are as follows. [1 −1 −1 1 −1 1 1 1 −1 1 1 1 1 −1 −1 −1]

TABLE 46

| L-STF | L-LTF |
|---|---|
| 7.5260 | 8.7033 |

The optimal phase rotation in another L-LTF and max PAPR values in L-STF/L-LTF are as follows. [1 −1 −1 1 −1 −1 −1 1 1 1 −1 1 1 1 1 −1]

The optimal phase rotation in another L-LTF and max PAPR values in L-STF/L-LTF are as follows. [1 −1 −1 −1 1 −1 −1 1 1 1 −1 1 1 1 1 −1]

TABLE 47

| L-STF | L-LTF |
|---|---|
| 7.9567 | 8.7033 |

The optimal phase rotation in another L-LTF and max PAPR values in L-STF/L-LTF are as follows. [1 −1 −1 −1 1 −1 −1 1 1 −1 1 1 1 1 −1]

TABLE 48

| L-STF | L-LTF |
|---|---|
| 7.9401 | 8.7033 |

The optimal phase rotation in another L-LTF and max PAPR values in L-STF/L-LTF are as follows.

[1 −1 −1 −1 1 −1 −1 1 −1 1 1 1 −1 1 1 1]

TABLE 49

| L-STF | L-LTF |
|---|---|
| 7.8868 | 8.7033 |

The optimal phase rotation in another L-LTF and max PAPR values in L-STF/L-LTF are as follows. [1 −1 −1 −1 1 −1 −1 −1 1 1 1 −1 1 1 −1 1]

TABLE 50

| L-STF | L-LTF |
|-------|-------|
| 8.1414 | 8.7033 |

The optimal phase rotation in another L-LTF and max PAPR values in L-STF/L-LTF are as follows. [1 −1 −1 −1 1 −1 −1 −1 −1 1 1 1 1 −1 1 1]

TABLE 51

| L-STF | L-LTF |
|-------|-------|
| 7.8868 | 8.7033 |

The optimal phase rotation in another L-LTF and max PAPR values in L-STF/L-LTF are as follows. [1 −1 −1 −1 −1 1 1 1 1 −1 1 1 1 −1 −1 1]

TABLE 52

| L-STF | L-LTF |
|-------|-------|
| 7.8904 | 8.7033 |

The optimal phase rotation in another L-LTF and max PAPR values in L-STF/L-LTF are as follows. [1 −1 −1 −1 −1 1 1 1 −1 1 1 1 −1 1 1 −1]

TABLE 53

| L-STF | L-LTF |
|-------|-------|
| 7.9567 | 8.7033 |

The optimal phase rotation in another L-LTF and max PAPR values in L-STF/L-LTF are as follows. [1 −1 −1 −1 −1 1 1 1 −1 1 1 1 −1 1 −1 −1]

TABLE 54

| L-STF | L-LTF |
|-------|-------|
| 7.8183 | 8.7033 |

The optimal phase rotation in another L-LTF and max PAPR values in L-STF/L-LTF are as follows. [1 −1 −1 −1 −1 1 1 −1 −1 −1 1 −1 −1 1 1 1]

TABLE 55

| L-STF | L-LTF |
|-------|-------|
| 7.8844 | 8.7033 |

The optimal phase rotation in another L-LTF and max PAPR values in L-STF/L-LTF are as follows. [1 −1 −1 −1 −1 1 −1 −1 −1 1 1 −1 1 1 1 −1]

TABLE 56

| L-STF | L-LTF |
|-------|-------|
| 7.9401 | 8.7033 |

The phase rotation proposed in 2.1.2. considering various RF capabilities may be desirable. In addition, it may be desirable to use a sequence optimized for both L-STF and L-LTF, [1 1 1 −1 −1 −1 1 1 −1 −1 −1 1 1 −1 1 1 −1] or [1 −1 −1 1 −1 1 1 1 −1 1 1 1 1 −1 −1 −1].

4.2. Phase Rotation of 240/160+80 MHz

240/160+80 MHz can be configured by puncturing 80 MHz among 320/160+160 MHz. In this case, phase rotation of 240/160+80 MHz can be configured by puncturing 320/160+160 MHz phase rotation. For example, it is assumed that phase rotation of [1 1 1 −1 −1 −1 −1 1 −1 −1 −1 1 −1 1 1 −1] is used at 320 MHz. If the first 80 MHz is punctured and the remaining phase rotation is used for 240 MHz transmission, the following phase rotation value may be applied to 240 MHz.

[−1 −1 −1 1 −1 −1 −1 1 −1 1 1 −1]

If the second 80 MHz of 320 MHz is punctured, the following phase rotation value can be applied to 240 MHz.

[1 1 1 −1 −1 −1 −1 1 −1 1 1 −1]

If the third 80 MHz among 320 MHz is punctured, the following phase rotation value can be applied to 240 MHz.

[1 1 1 −1 −1 −1 −1 1 −1 1 1 −1]

If the fourth 80 MHz among 320 MHz is punctured, the following phase rotation value can be applied to 240 MHz.

[1 1 1 −1 −1 −1 −1 1 −1 −1 −1 1]

As another example, it is assumed that phase rotation of [1 −1 −1 1 −1 1 1 1 −1 1 1 1 1 1 −1 −1 −1] is used at 320 MHz. If the first 80 MHz is punctured and the remaining phase rotation is used for 240 MHz transmission, the following phase rotation value may be applied to 240 MHz.

[−1 1 1 1 −1 1 1 1 1 −1 −1 −1]

If the second 80 MHz of 320 MHz is punctured, the following phase rotation value can be applied to 240 MHz.

[1 −1 −1 1 −1 1 1 1 1 −1 −1 −1]

If the third 80 MHz among 320 MHz is punctured, the following phase rotation value can be applied to 240 MHz.

[1 −1 −1 1 −1 1 1 1 1 −1 −1 −1]

If the fourth 80 MHz among 320 MHz is punctured, the following phase rotation value can be applied to 240 MHz.

[1 −1 −1 1 −1 1 1 1 −1 1 1 1]

Figure 12:
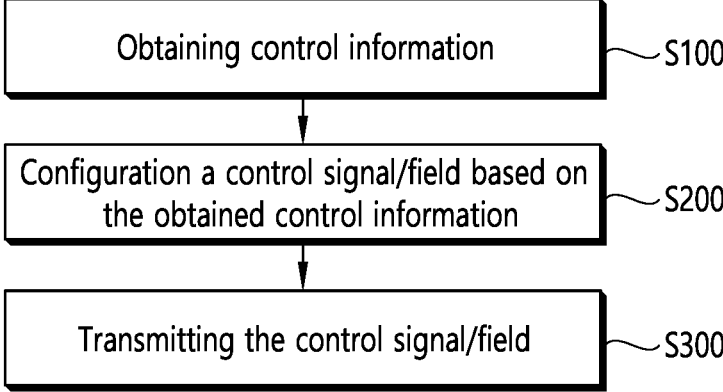
FIG. 12 is a flow diagram illustrating the operation of a transmitting apparatus according to the present embodiment.

FIG. 12 is a flowchart showing operations of a transmitting apparatus according to the present embodiment.

The above-described phase rotation may be applied based on the apparatus of FIG. 12.

An example of FIG. 12 may be performed by a transmitting apparatus (AP and/or non-AP STA). Part of each step (or detailed sub-step that will be described later on) in the example of FIG. 12 may be skipped (or omitted) or varied.

In step S100, a transmitting apparatus (i.e., transmitting STA) may obtain control information for an STF sequence. For example, the transmitting apparatus may obtain information related to a bandwidth (e.g., 80/160/240/320 MHz) that is applied to the STF sequence. Additionally or alternatively, the transmitting apparatus may obtain information (e.g., information instructing generation of 1×, 2×, 4× sequence(s)) related to a characteristic that is applied to the STF sequence.

In step S200, the transmitting apparatus may configure or generate a control signal/control field (e.g., EHT-STF signal/field) based on the obtained control information (e.g., information related to bandwidth).

Step S200 may include more detailed sub-steps.

For example, step S200 may further include a step of selecting one STF sequence among multiple STF sequences based on the control information that is obtained in step S100.

Additionally or alternatively, step S200 may further include a step of performing power boosting.

Step S200 may also be referred to as a step of generating a sequence.

In step S300, the transmitting apparatus may transmit the signal/field/sequence, which is configured or generated in step S200, to a receiving apparatus based on step S300.

Step S300 may include more detailed sub-steps.

For example, the transmitting apparatus may perform a Phase rotation step. More specifically, the transmitting apparatus may also perform a Phase rotation step in 20 MHz*N units (wherein N=integer) for the sequence that is generated in step S200.

Additionally or alternatively, the transmitting apparatus may transmit at least one of the operations of CSD, Spatial Mapping, IDFT/IFFT operation, GI insertion, and so on.

The signal(s)/field(s)/sequences(s) that is/are configured according to the present specification may be transmitted in the format of FIG. 10.

An example of FIG. 12 is related to a transmitting apparatus (AP and/or non-AP STA).

As shown in FIG. 1, the transmitting apparatus (or transmitter) may include a memory 112, a processor 111, and a transceiver 113.

The memory 112 may store information on multiple STF sequences that are described in the present specification. Additionally, the memory 112 may store control information for generating STF sequence(s)/PPDU(s).

The processor 111 may generate various sequences (e.g., STF sequences) based on the information stored in the memory 112 and may configure a PPDU. An example of the PPDU that is generated by the processor 111 may be the same as FIG. 10.

The processor 111 may perform part of the operations shown in FIG. 12. For example, the processor 111 may obtain control information for generating STF sequences and may configure an STF sequence.

For example, the processor 111 may include additional detailed units. The processor 111 may perform operations, such as CSD, Spatial Mapping, IDFT/IFFT operation, GI insertion, and so on.

The transceiver 113 shown in the drawing includes an antenna and may perform analog signal processing. More specifically, the processor 111 may control the transceiver 113 so that the PPDU generated by the processor 111 can be transmitted.

Figure 13:
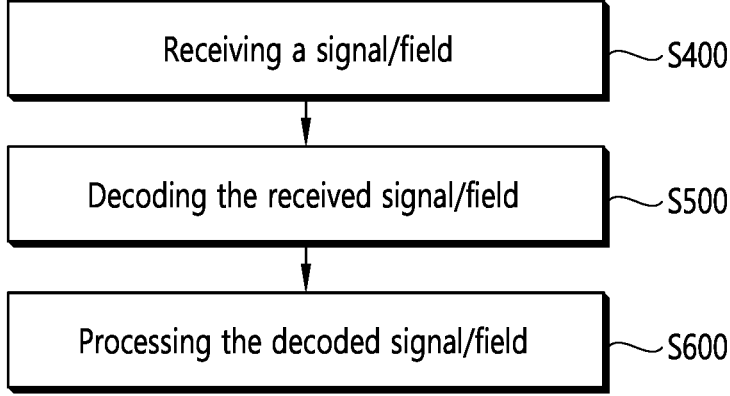
FIG. 13 is a flow diagram illustrating the operation of a receiving apparatus according to the present embodiment.

FIG. 13 is a flowchart showing operations of a receiving apparatus according to the present embodiment.

The above-described phase rotation may be applied in accordance with the example of FIG. 13.

An example of FIG. 13 may be performed by a receiving apparatus (AP and/or non-AP STA).

An example of FIG. 13 may be performed by a receiving STA or receiving apparatus (AP and/or non-AP STA). Part of each step (or detailed sub-step that will be described later on) in the example of FIG. 13 may be skipped (or omitted).

In step S400, the receiving apparatus (receiving STA) may receive a signal/field including an STF sequence (i.e., EHT-STF/EHT-S sequence) through step S400. The received signal may have the format shown in FIG. 10.

A sub-step of step S400 may be determined based on step S300. That is, step S400 may perform operations of recovering (or reconfiguring) the results of the operations of CSD, Spatial Mapping, IDFT/IFFT operation, GI insertion, and so on, which are applied in step S300.

In step S400, the STF sequence may perform various functions, such as finding (or discovering) time/frequency synchronization of a signal, estimating AGC gain, and so on.

In step S500, the receiving apparatus may perform decoding on the received signal based on the STF sequence.

For example, step S500 may include a step of decoding a data field of a PPDU including the STF sequence. That is, the receiving apparatus may decode a signal that is included in a data field of a successfully received PPDU based on the STF sequence.

In step S600, the receiving apparatus may process the data that is decoded in step S500.

For example, the receiving apparatus may perform a processing operation of delivering (or transferring) data that is decoded in step S500 to a higher layer (e.g., MAC layer). Furthermore, when signal generation is instructed to the PHY layer from the higher layer in response to the data that is delivered to the higher layer, subsequent operations may be performed.

An example of FIG. 13 is related to a transmitting apparatus (AP and/or non-AP STA).

As shown in FIG. 1, the transmitting apparatus (or transmitter) may include a memory 112, a processor 111, and a transceiver 113.

The memory 112 may store information on multiple STF sequences that are described in the present specification. Additionally, the memory 112 may store control information for generating STF sequence(s)/PPDU(s).

The processor 111 may generate various sequences (e.g., STF sequences) based on the information stored in the memory 112 and may configure a PPDU. An example of the PPDU that is generated by the processor 111 may be the same as FIG. 10.

The processor 111 may perform part of the operations shown in FIG. 13. For example, the processor 111 may obtain control information for generating STF sequences and may configure an STF sequence.

For example, the processor 111 may include additional detailed units. The processor 111 may perform operations, such as CSD, Spatial Mapping, IDFT/IFFT operation, GI insertion, and so on.

The transceiver 113 shown in the drawing includes an antenna and may perform analog signal processing. More specifically, the processor 111 may control the transceiver 113 so that the PPDU generated by the processor 111 can be transmitted.

Part of the technical characteristics (or features) shown in FIG. 13 may be implemented by the transceiver 113. More specifically, analog RF processing that is shown in the drawing may be included in the transceiver 113.

Hereinafter, the above-described embodiment will be described with reference to FIG. 1 to FIG. 13.

FIG. 14 is a flowchart showing a procedure for transmitting a PPDU, by a transmitting STA, according to the present embodiment.

The example of FIG. 14 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

The example of FIG. 14 is performed by a transmitting STA, and the transmitting STA may correspond to an access point (AP). A receiving STA of FIG. 14 may correspond to an STA that supports an Extremely High Throughput (EHT) WLAN system.

This embodiment proposes a method and apparatus for configuring a phase rotation value applied capable of obtaining an optimized PAPR in L-STF or L-LTF in consideration of limited preamble puncturing when transmitting a PPDU through a broadband.

In step S1410, a transmitting station (STA) generates a Physical Protocol Data Unit (PPDU).

In step S1420, the transmitting STA transmits the PPDU to a receiving STA through a broadband.

The PPDU includes a legacy preamble and first and second signal fields. The legacy preamble may include a Legacy-Short Training Field (L-STF) and a Legacy-Long Training Field (L-LTF). The first signal field may be a Universal-Signal (U-SIG), and the second signal field may be an Extremely High Throughput-Signal (EHT-SIG). The PPDU may further include an EHT-STF, an EHT-LTF and a data field.

The legacy preamble and the first and second signal fields are generated based on a first phase rotation value. That is, the phase rotation may be applied from the legacy preamble to the EHT-SIG.

When the broadband is a 320 MHz band, the first phase rotation value is [1 1 1 −1 1 1 1 −1 −1 −1 −1 1 1 −1 −1 1 −1]. This embodiment proposes a phase rotation value obtained by optimizing PAPR in L-STF or L-LTF using the full search method for the broadband. That is, the first phase rotation value is the most optimized phase rotation value in terms of PAPR by performing a full search for the 320 MHz band. In addition, the first phase rotation value is configured of only binary element 1 or −1, and as much as the first phase rotation value is configured using only the binary element, there is an effect that the implementation complexity of the phase rotation value is low.

The first phase rotation value is obtained based on a first preamble puncturing pattern of the broadband. The first preamble puncturing pattern may include a pattern in which a 40 MHz or 80 MHz band is punctured in the broadband.

In addition, this embodiment proposes a method of obtaining a phase rotation value in consideration of the limited preamble puncturing called the first preamble puncturing pattern.

Since the broadband is a 320 MHz (or 160+160 MHz) band, the broadband may include first to fourth 80 MHz band. The first to fourth 80 MHz bands may be arranged in order from a low frequency to a high frequency and may be continuous with each other. The first preamble puncturing pattern may include first to fourteenth patterns.

For example, the first pattern may be a pattern in which a 40 MHz band within the first 80 MHz band in the broadband is punctured, the second pattern may be a pattern in which a 40 MHz band within the second 80 MHz band in the broadband is punctured, the third pattern may be a pattern in which a 40 MHz band within the third 80 MHz band in the broadband is punctured, the fourth pattern may be a pattern in which a 40 MHz band within the fourth 80 MHz band in the broadband is punctured.

The first to fourth patterns may be patterns in which a 40 MHz band is punctured in the broadband. The 40 MHz bands punctured in the first to fourth 80 MHz bands may be 40 MHz bands at both ends of each 80 MHz band, may not be the middle 40 MHz band of each 80 MHz band.

The fifth pattern may be a pattern in which the first 80 MHz band is punctured in the broadband, the sixth pattern may be a pattern in which the second 80 MHz band is punctured in the broadband, the seventh pattern may be a pattern in which the third 80 MHz band is punctured in the broadband, the eighth pattern may be a pattern in which the fourth 80 MHz band is punctured in the broadband.

The fifth to eighth patterns may be patterns in which the 80 MHz band is punctured in the broadband, the first to fourth 80 MHz bands themselves are punctured, and the broadband may not be partially punctured for two or more 80 MHz bands.

The ninth pattern may be a pattern in which the first 80 MHz band is punctured and a 40 MHz band in the second 80 MHz band is punctured in the broadband, the tenth pattern may be a pattern in which the first 80 MHz band is punctured and a 40 MHz band within the third 80 MHz band is punctured in the broadband, the eleventh pattern may be a pattern in which the first 80 MHz band is punctured and a 40 MHz band within the fourth 80 MHz band is punctured in the broadband.

The twelfth pattern may be a pattern in which the fourth 80 MHz band is punctured and a 40 MHz band within the first 80 MHz band is punctured in the broadband, the thirteenth pattern may be a pattern in which the fourth 80 MHz band is punctured and a 40 MHz band in the second 80 MHz band is punctured in the broadband, the fourteenth pattern may be a pattern in which the fourth 80 MHz band is punctured and a 40 MHz band within the third 80 MHz band is punctured in the broadband.

One element of the first phase rotation value may be a phase rotation value applied to each 20 MHz band of the 320 MHz band.

Specifically, a subcarrier range to which the phase rotation value is applied will be described.

The 320 MHz band (or the 160+160 MHz band) may consist of subcarriers having subcarrier indexes from −512 to 511. A first 1 of the first phase rotation values may be applied to subcarriers having a subcarrier index of −512 to −449, a second 1 of the first phase rotation value may be applied to subcarriers having a subcarrier index of −448 to −385, a third 1 of the first phase rotation value may be applied to subcarriers having subcarrier indices from −384 to −321, a fourth −1 of the first phase rotation value may be applied to subcarriers having subcarrier indexes from −320 to −257.

A fifth 1 of the first phase rotation values may be applied to a subcarrier having a subcarrier index of −256 to −193, a sixth 1 of the first phase rotation values may be applied to subcarriers having subcarrier indices from −192 to −129, a seventh 1 of the first phase rotation values may be applied to subcarriers having a subcarrier index of −128 to −65, an eighth −1 of the first phase rotation values may be applied to subcarriers having a subcarrier index of −64 to −1.

A ninth −1 of the first phase rotation values may be applied to subcarriers having subcarrier indexes from 0 to 63, a tenth −1 of the first phase rotation values may be applied to subcarriers having subcarrier indexes from 64 to 127, an eleventh −1 of the first phase rotation values may be applied to subcarriers having subcarrier indexes from 128 to 191, a twelfth 1 of the first phase rotation values may be applied to subcarriers having a subcarrier index of 192 to 255.

A thirteenth −1 of the first phase rotation values may be applied to subcarriers having subcarrier indices from 256 to 319, a fourteenth −1 of the first phase rotation values may be applied to subcarriers having subcarrier indices from 320 to 383, a fifteenth 1 of the first phase rotation values may be applied to subcarriers having subcarrier indices from 384 to 447, a sixteenth −1 of the first phase rotation values may be applied to subcarriers having subcarrier indices 448 to 511.

The first phase rotation value may be a phase rotation value for the broadband to obtain an optimal Peak-to-Average Power Ratio (PAPR) of the L-STF and the L-LTF. The optimal PAPR of the L-STF and the L-LTF may be obtained based on a combination of a radio frequency (RF) used when transmitting the PPDU. The combination of the RF may include a combination of two RFs with 160 MHz capability or one RF with 320 MHz capability.

In the above-described embodiment, even when the PPDU is transmitted through a 240 MHz/160+80 MHz/80+160 MHz band, a phase rotation value may be defined and applied to the legacy preamble and the first and second signal fields by using the same method. However, the 240 MHz/160+80 MHz/80+160 MHz band may be determined as a band in which 80 MHz-based preamble puncturing is performed for the 320 MHz/160+160 MHz band, without defining a separate phase rotation value for the 240 MHz/160+80 MHz/80+160 MHz band, the phase rotation value defined in the 320 MHz/160+160 MHz band may be unified and used (unified method).

For example, if a phase rotation value (first phase rotation value) for the 320 MHz/160+160 MHz band is assumed as [1 1 1 −1 1 1 1 −1 −1 −1 −1 1 −1 −1 1 −1], a phase rotation value for the 240 MHz/160+80 MHz/80+160 MHz band may be determined in accordance with the 80 MHz band that is being punctured. In the 320 MHz/160+160 MHz band, when a first 80 MHz band is punctured, the phase rotation value for the 240 MHz/160+80 MHz/80+160 MHz band may be [1 1 1 −1 −1 −1 −1 1 −1 −1 1 −1]. In the 320 MHz/160+160 MHz band, when a second 80 MHz band is punctured, the phase rotation value for the 240 MHz/160+80 MHz/80+160 MHz band may be [1 1 1 −1 −1 −1 −1 1 −1 −1 1 −1]. In the 320 MHz/160+160 MHz band, when a third 80 MHz band is punctured, the phase rotation value for the 240 MHz/160+80 MHz/80+160 MHz band may be [1 1 1 −1 1 1 1 −1 −1 −1 1 −1]. And, in the 320 MHz/160+160 MHz band, when a fourth 80 MHz band is punctured, the phase rotation value for the 240 MHz/160+80 MHz/80+160 MHz band may be [1 1 1 −1 1 1 1 −1 −1 −1 −1 1].

The first signal field may include information on the first preamble puncturing pattern (or Punctured Channel Information). In addition, the first signal field may further include information on bandwidth and information on PPDU type and compression mode. The second signal field may include resource unit (RU) information. The transmitting STA may inform information on the tone plan at 160/240/320 MHz through the first and second signal fields. In addition, the EHT-STF, the EHT-LTF, and the data field may be transmitted/received in a band (or RU) included in a tone plan of the broadband.

FIG. 15 is a flowchart showing a procedure for receiving a PPDU, by a receiving STA, according to the present embodiment.

The example of FIG. 15 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

The example of FIG. 15 may be performed by a receiving STA, and the receiving STA may correspond to an STA supporting an Extremely High Throughput (EHT) WLAN system. A transmitting STA of FIG. 15 may correspond to an access point (AP).

This embodiment proposes a method and apparatus for configuring a phase rotation value applied capable of obtaining an optimized PAPR in L-STF or L-LTF in consideration of limited preamble puncturing when transmitting a PPDU through a broadband.

In step S1510, a receiving station (STA) receives a Physical Protocol Data Unit (PPDU) from a transmitting STA through a broadband.

In step S1520, the receiving STA decodes the PPDU.

The PPDU includes a legacy preamble and first and second signal fields. The legacy preamble may include a Legacy-Short Training Field (L-STF) and a Legacy-Long Training Field (L-LTF). The first signal field may be a Universal-Signal (U-SIG), and the second signal field may be an Extremely High Throughput-Signal (EHT-SIG). The PPDU may further include an EHT-STF, an EHT-LTF and a data field.

The legacy preamble and the first and second signal fields are generated based on a first phase rotation value. That is, the phase rotation may be applied from the legacy preamble to the EHT-SIG.

When the broadband is a 320 MHz band, the first phase rotation value is [1 1 1 −1 1 1 1 −1 −1 −1 −1 1 −1 −1 1 −1]. This embodiment proposes a phase rotation value obtained by optimizing PAPR in L-STF or L-LTF using the full search method for the broadband. That is, the first phase rotation value is the most optimized phase rotation value in terms of PAPR by performing a full search for the 320 MHz band. In addition, the first phase rotation value is configured of only binary element 1 or −1, and as much as the first phase rotation value is configured using only the binary element, there is an effect that the implementation complexity of the phase rotation value is low.

The first phase rotation value is obtained based on a first preamble puncturing pattern of the broadband. The first preamble puncturing pattern may include a pattern in which a 40 MHz or 80 MHz band is punctured in the broadband.

In addition, this embodiment proposes a method of obtaining a phase rotation value in consideration of the limited preamble puncturing called the first preamble puncturing pattern.

Since the broadband is a 320 MHz (or 160+160 MHz) band, the broadband may include first to fourth 80 MHz bands. The first to fourth 80 MHz bands may be arranged in order from a low frequency to a high frequency and may be continuous with each other. The first preamble puncturing pattern may include first to fourteenth patterns.

For example, the first pattern may be a pattern in which a 40 MHz band within the first 80 MHz band in the broadband is punctured, the second pattern may be a pattern in which a 40 MHz band within the second 80 MHz band in the broadband is punctured, the third pattern may be a pattern in which a 40 MHz band within the third 80 MHz band in the broadband is punctured, the fourth pattern may be a pattern in which a 40 MHz band within the fourth 80 MHz band in the broadband is punctured.

The first to fourth patterns may be patterns in which a 40 MHz band is punctured in the broadband. The 40 MHz bands punctured in the first to fourth 80 MHz bands may be 40 MHz bands at both ends of each 80 MHz band, may not be the middle 40 MHz band of each 80 MHz band.

The fifth pattern may be a pattern in which the first 80 MHz band is punctured in the broadband, the sixth pattern may be a pattern in which the second 80 MHz band is punctured in the broadband, the seventh pattern may be a pattern in which the third 80 MHz band is punctured in the broadband, the eighth pattern may be a pattern in which the fourth 80 MHz band is punctured in the broadband.

The fifth to eighth patterns may be patterns in which the 80 MHz band is punctured in the broadband, the first to fourth 80 MHz bands themselves are punctured, and the broadband may not be partially punctured for two or more 80 MHz bands.

The ninth pattern may be a pattern in which the first 80 MHz band is punctured and a 40 MHz band in the second 80 MHz band is punctured in the broadband, the tenth pattern may be a pattern in which the first 80 MHz band is punctured and a 40 MHz band within the third 80 MHz band is punctured in the broadband, the eleventh pattern may be a pattern in which the first 80 MHz band is punctured and a 40 MHz band within the fourth 80 MHz band is punctured in the broadband.

The twelfth pattern may be a pattern in which the fourth 80 MHz band is punctured and a 40 MHz band within the first 80 MHz band is punctured in the broadband, the thirteenth pattern may be a pattern in which the fourth 80 MHz band is punctured and a 40 MHz band in the second 80 MHz band is punctured in the broadband, the fourteenth pattern may be a pattern in which the fourth 80 MHz band is punctured and a 40 MHz band within the third 80 MHz band is punctured in the broadband.

One element of the first phase rotation value may be a phase rotation value applied to each 20 MHz band of the 320 MHz band.

Specifically, a subcarrier range to which the phase rotation value is applied will be described.

The 320 MHz band (or the 160+160 MHz band) may consist of subcarriers having subcarrier indexes from −512 to 511. A first 1 of the first phase rotation values may be applied to subcarriers having a subcarrier index of −512 to −449, a second 1 of the first phase rotation value may be applied to subcarriers having a subcarrier index of −448 to −385, a third 1 of the first phase rotation value may be applied to subcarriers having subcarrier indices from −384 to −321, a fourth −1 of the first phase rotation value may be applied to subcarriers having subcarrier indexes from −320 to −257.

A fifth 1 of the first phase rotation values may be applied to a subcarrier having a subcarrier index of −256 to −193, a sixth 1 of the first phase rotation values may be applied to subcarriers having subcarrier indices from −192 to −129, a seventh 1 of the first phase rotation values may be applied to subcarriers having a subcarrier index of −128 to −65, an eighth −1 of the first phase rotation values may be applied to subcarriers having a subcarrier index of −64 to −1.

A ninth −1 of the first phase rotation values may be applied to subcarriers having subcarrier indexes from 0 to 63, a tenth −1 of the first phase rotation values may be applied to subcarriers having subcarrier indexes from 64 to 127, an eleventh −1 of the first phase rotation values may be applied to subcarriers having subcarrier indexes from 128 to 191, a twelfth 1 of the first phase rotation values may be applied to subcarriers having a subcarrier index of 192 to 255.

A thirteenth −1 of the first phase rotation values may be applied to subcarriers having subcarrier indices from 256 to 319, a fourteenth −1 of the first phase rotation values may be applied to subcarriers having subcarrier indices from 320 to 383, a fifteenth 1 of the first phase rotation values may be applied to subcarriers having subcarrier indices from 384 to 447, a sixteenth −1 of the first phase rotation values may be applied to subcarriers having subcarrier indices 448 to 511.

The first phase rotation value may be a phase rotation value for the broadband to obtain an optimal Peak-to-Average Power Ratio (PAPR) of the L-STF and the L-LTF.

The optimal PAPR of the L-STF and the L-LTF may be obtained based on a combination of a radio frequency (RF) used when transmitting the PPDU. The combination of the RF may include a combination of two RFs with 160 MHz capability or one RF with 320 MHz capability.

In the above-described embodiment, even when the PPDU is transmitted through a 240 MHz/160+80 MHz/80+160 MHz band, a phase rotation value may be defined and applied to the legacy preamble and the first and second signal fields by using the same method. However, the 240 MHz/160+80 MHz/80+160 MHz band may be determined as a band in which 80 MHz-based preamble puncturing is performed for the 320 MHz/160+160 MHz band, without defining a separate phase rotation value for the 240 MHz/160+80 MHz/80+160 MHz band, the phase rotation value defined in the 320 MHz/160+160 MHz band may be unified and used (unified method).

For example, if a phase rotation value (first phase rotation value) for the 320 MHz/160+160 MHz band is assumed as [1 1 1 −1 1 1 1 −1 −1 −1 −1 1 −1 −1 1 −1], a phase rotation value for the 240 MHz/160+80 MHz/80+160 MHz band may be determined in accordance with the 80 MHz band that is being punctured. In the 320 MHz/160+160 MHz band, when a first 80 MHz band is punctured, the phase rotation value for the 240 MHz/160+80 MHz/80+160 MHz band may be [1 1 1 −1 −1 −1 −1 1 −1 −1 1 −1]. In the 320 MHz/160+160 MHz band, when a second 80 MHz band is punctured, the phase rotation value for the 240 MHz/160+80 MHz/80+160 MHz band may be [1 1 1 −1 −1 −1 −1 1 −1 −1 1 −1]. In the 320 MHz/160+160 MHz band, when a third 80 MHz band is punctured, the phase rotation value for the 240 MHz/160+80 MHz/80+160 MHz band may be [1 1 1 −1 1 1 1 −1 −1 −1 1 −1]. And, in the 320 MHz/160+160 MHz band, when a fourth 80 MHz band is punctured, the phase rotation value for the 240 MHz/160+80 MHz/80+160 MHz band may be [1 1 1 −1 1 1 1 −1 −1 −1 −1 1].

The first signal field may include information on the first preamble puncturing pattern (or Punctured Channel Information). In addition, the first signal field may further include information on bandwidth and information on PPDU type and compression mode. The second signal field may include resource unit (RU) information. The transmitting STA may inform information on the tone plan at 160/240/320 MHz through the first and second signal fields. In addition, the EHT-STF, the EHT-LTF, and the data field may be transmitted/received in a band (or RU) included in a tone plan of the broadband.

3. Device Configuration

The technical features of the present disclosure may be applied to various devices and methods. For example, the technical features of the present disclosure may be performed/supported through the device(s) of FIG. 1 and/or FIG. 10. For example, the technical features of the present disclosure may be applied to only part of FIG. 1 and/or FIG. 10. For example, the technical features of the present disclosure may be implemented based on the processing chip(s) 114 and 124 of FIG. 1, or implemented based on processor(s) 111 and 121 and the memory(s) 112 and 122, or implemented based on the processor 610 and the memory 620 of FIG. 10. For example, the device according to the present disclosure receives a Physical Protocol Data Unit (PPDU) from a transmitting station (STA) through a broadband, and decodes the PPDU.

The technical features of the present disclosure may be implemented based on a computer readable medium (CRM).

For example, a CRM according to the present disclosure is at least one computer readable medium including instructions designed to be executed by at least one processor.

The CRM may store instructions that perform operations including receiving a Physical Protocol Data Unit (PPDU) from a transmitting STA through a broadband and decoding the PPDU. At least one processor may execute the instructions stored in the CRM according to the present disclosure. At least one processor related to the CRM of the present disclosure may be the processor 111, 121 of FIG. 1, the processing chip 114, 124 of FIG. 1, or the processor 610 of FIG. 10. Meanwhile, the CRM of the present disclosure may be the memory 112, 122 of FIG. 1, the memory 620 of FIG. 10, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:

receiving, by a receiving station (STA), a Physical Protocol Data Unit (PPDU) from a transmitting STA; and decoding, by the receiving STA, the PPDU, wherein the PPDU includes a legacy preamble, first and second signal fields, wherein the legacy preamble and the first and second signal fields are generated based on a first phase rotation value, wherein based on the PPDU being transmitted through a 320 MHz band, the first phase rotation value is [1 1 1 −1 1 1 1 −1 −1 −1 −1 1 −1 −1 1 −1], wherein the first phase rotation value is obtained based on a first preamble puncturing pattern of the 320 MHz band, wherein the first preamble puncturing pattern includes a pattern in which a 40 MHz or 80 MHz band is punctured in the 320 MHz band, wherein the 320 MHz band includes first to fourth 80 MHz bands, wherein the first preamble puncturing pattern includes first to fourteenth patterns, wherein the first pattern is a pattern in which a 40 MHz band within the first 80 MHz band in the 320 MHz band is punctured, wherein the second pattern is a pattern in which a 40 MHz band within the second 80 MHz band in the 320 MHz band is punctured, wherein the third pattern is a pattern in which a 40 MHz band within the third 80 MHz band in the 320 MHz band is punctured, wherein the fourth pattern is a pattern in which a 40 MHz band within the fourth 80 MHz band in the 320 MHz band is punctured, wherein for the first to fourth patterns, the 40 MHz band punctured within the first to fourth 80 MHz bands is one of 40 MHz bands at both ends of each 80 MHz band, is not a middle 40 MHz band of the each 80 MHz band, wherein the fifth pattern is a pattern in which the first 80 MHz band is punctured in the 320 MHz band, wherein the sixth pattern is a pattern in which the second 80 MHz band is punctured in the 320 MHz band, wherein the seventh pattern is a pattern in which the third 80 MHz band is punctured in the 320 MHz band, wherein the eighth pattern is a pattern in which the fourth 80 MHz band is punctured in the 320 MHz band, and wherein for the fifth to eighth patterns, the first to fourth 80 MHz bands are punctured, and two or more of the 80 MHz bands among the first to fourth 80 MHz bands are not partially punctured in the 320 MHz band.

2. The method of claim 1, wherein the ninth pattern is a pattern in which the first 80 MHz band is punctured and a 40 MHz band in the second 80 MHz band is punctured in the 320 MHz band, wherein the tenth pattern is a pattern in which the first 80 MHz band is punctured and a 40 MHz band within the third 80 MHz band is punctured in the 320 MHz band, wherein the eleventh pattern is a pattern in which the first 80 MHz band is punctured and a 40 MHz band within the fourth 80 MHz band is punctured in the 320 MHz band, wherein the twelfth pattern is a pattern in which the fourth 80 MHz band is punctured and a 40 MHz band within the first 80 MHz band is punctured in the 320 MHz band, wherein the thirteenth pattern is a pattern in which the fourth 80 MHz band is punctured and a 40 MHz band in the second 80 MHz band is punctured in the 320 MHz band, wherein the fourteenth pattern is a pattern in which the fourth 80 MHz band is punctured and a 40 MHz band within the third 80 MHz band is punctured in the 320 MHz band.

3. The method of claim 1, wherein one element of the first phase rotation value is a phase rotation value applied to each 20 MHz band of the 320 MHz band, wherein the 320 MHz band consists of subcarriers having subcarrier indexes from −512 to 511, wherein a first 1 of the first phase rotation values is applied to subcarriers having a subcarrier index of −512 to −449, wherein a second 1 of the first phase rotation value is applied to subcarriers having a subcarrier index of −448 to −385, wherein a third 1 of the first phase rotation value is applied to subcarriers having subcarrier indices from −384 to −321, wherein a fourth −1 of the first phase rotation value is applied to subcarriers having subcarrier indexes from −320 to −257, wherein a fifth 1 of the first phase rotation values is applied to a subcarrier having a subcarrier index of −256 to −193, wherein a sixth 1 of the first phase rotation values is applied to subcarriers having subcarrier indices from −192 to −129, wherein a seventh 1 of the first phase rotation values is applied to subcarriers having a subcarrier index of −128 to −65, wherein an eighth −1 of the first phase rotation values is applied to subcarriers having a subcarrier index of −64 to −1, wherein a ninth −1 of the first phase rotation values is applied to subcarriers having subcarrier indexes from 0 to 63, wherein a tenth −1 of the first phase rotation values is applied to subcarriers having subcarrier indexes from 64 to 127, wherein an eleventh −1 of the first phase rotation values is applied to subcarriers having subcarrier indexes from 128 to 191, wherein a twelfth 1 of the first phase rotation values is applied to subcarriers having a subcarrier index of 192 to 255, wherein a thirteenth −1 among the first phase rotation values is applied to subcarriers having subcarrier indices from 256 to 319, wherein a fourteenth −1 of the first phase rotation values is applied to subcarriers having subcarrier indices from 320 to 383, wherein a fifteenth 1 of the first phase rotation values is applied to subcarriers having subcarrier indices from 384 to 447, wherein a sixteenth −1 of the first phase rotation values is applied to subcarriers having subcarrier indices 448 to 511.

4. The method of claim 1, wherein the legacy preamble includes a Legacy-Short Training Field (L-STF), a Legacy-Long Training Field (L-LTF) and a Legacy-Signal (L-SIG), wherein the first phase rotation value is a phase rotation value for the 320 MHz band to obtain an optimal Peak-to-Average Power Ratio (PAPR) of the L-STF and the L-LTF, wherein the optimal PAPR of the L-STF and the L-LTF are obtained based on a combination of a radio frequency (RF) used when transmitting the PPDU, wherein the combination of the RF includes a combination of two RFs with 160 MHz capability or one RF with 320 MHz capability.

5. The method of claim 1, wherein the first signal field is a Universal-Signal (U-SIG), the second signal field is an Extremely High Throughput-Signal (EHT-SIG), wherein the first signal field includes information on the first preamble puncturing pattern.

6. A receiving station (STA) in a wireless local area network (WLAN) system, the receiving STA comprising:

a memory;

a transceiver; and a processor being operatively connected to the memory and the transceiver, wherein the processor is configured to:

receive a Physical Protocol Data Unit (PPDU) from a transmitting station (STA), and decode the PPDU, wherein the PPDU includes a legacy preamble, first and second signal fields, wherein the legacy preamble and the first and second signal fields are generated based on a first phase rotation value, wherein based on the PPDU being transmitted through a 320 MHz band, the first phase rotation value is [1 1 1 −1 1 1 1 −1 −1 −1 −1 1 −1 −1 1 −1], wherein the first phase rotation value is obtained based on a first preamble puncturing pattern of the 320 MHz band, wherein the first preamble puncturing pattern includes a pattern in which a 40 MHz or 80 MHz band is punctured in the 320 MHz band, wherein the 320 MHz band includes first to fourth 80 MHz bands, wherein the first preamble puncturing pattern includes first to fourteenth patterns, wherein the first pattern is a pattern in which a 40 MHz band within the first 80 MHz band in the 320 MHz band is punctured, wherein the second pattern is a pattern in which a 40 MHz band within the second 80 MHz band in the 320 MHz band is punctured, wherein the third pattern is a pattern in which a 40 MHz band within the third 80 MHz band in the 320 MHz band is punctured, wherein the fourth pattern is a pattern in which a 40 MHz band within the fourth 80 MHz band in the 320 MHz band is punctured, wherein for the first to fourth patterns, the 40 MHz band punctured within the first to fourth 80 MHz bands is one of 40 MHz bands at both ends of each 80 MHz band, is not a middle 40 MHz band of the each 80 MHz band, wherein the fifth pattern is a pattern in which the first 80 MHz band is punctured in the 320 MHz band, wherein the sixth pattern is a pattern in which the second 80 MHz band is punctured in the 320 MHz band, wherein the seventh pattern is a pattern in which the third 80 MHz band is punctured in the 320 MHz band, wherein the eighth pattern is a pattern in which the fourth 80 MHz band is punctured in the 320 MHz band, and wherein for the fifth to eighth patterns, the first to fourth 80 MHz bands are punctured, and two or more of the 80 MHz bands among the first to fourth 80 MHz bands are not partially punctured in the 320 MHz band.

7. A method in a wireless local area network (WLAN) system, the method comprising:

generating, by a transmitting station (STA), a Physical Protocol Data Unit (PPDU); and transmitting, by the transmitting STA, the PPDU to a receiving STA, wherein the PPDU includes a legacy preamble, first and second signal fields, wherein the legacy preamble and the first and second signal fields are generated based on a first phase rotation value, and wherein based on the PPDU being transmitted through a 320 MHz band, the first phase rotation value is [1 1 1 −1 1 1 1 −1 −1 −1 −1 1 −1 −1 1 −1], wherein the first phase rotation value is obtained based on a first preamble puncturing pattern of the 320 MHz band, wherein the first preamble puncturing pattern includes a pattern in which a 40 MHz or 80 MHz band is punctured in the 320 MHz band, wherein the 320 MHz band includes first to fourth 80 MHz bands, wherein the first preamble puncturing pattern includes first to fourteenth patterns, wherein the first pattern is a pattern in which a 40 MHz band within the first 80 MHz band in the 320 MHz band is punctured, wherein the second pattern is a pattern in which a 40 MHz band within the second 80 MHz band in the 320 MHz band is punctured, wherein the third pattern is a pattern in which a 40 MHz band within the third 80 MHz band in the 320 MHz band is punctured, wherein the fourth pattern is a pattern in which a 40 MHz band within the fourth 80 MHz band in the 320 MHz band is punctured, wherein for the first to fourth patterns, the 40 MHz band punctured within the first to fourth 80 MHz bands is one of 40 MHz bands at both ends of each 80 MHz band, is not a middle 40 MHz band of the each 80 MHz band, wherein the fifth pattern is a pattern in which the first 80 MHz band is punctured in the 320 MHz band, wherein the sixth pattern is a pattern in which the second 80 MHz band is punctured in the 320 MHz band, wherein the seventh pattern is a pattern in which the third 80 MHz band is punctured in the 320 MHz band, wherein the eighth pattern is a pattern in which the fourth 80 MHz band is punctured in the 320 MHz band, and wherein for the fifth to eighth patterns, the first to fourth 80 MHz bands are punctured, and two or more of the 80 MHz bands among the first to fourth 80 MHz bands are not partially punctured in the 320 MHz band.

8. The method of claim 7, wherein the ninth pattern is a pattern in which the first 80 MHz band is punctured and a 40 MHz band in the second 80 MHz band is punctured in the 320 MHz band, wherein the tenth pattern is a pattern in which the first 80 MHz band is punctured and a 40 MHz band within the third 80 MHz band is punctured in the 320 MHz band, wherein the eleventh pattern is a pattern in which the first 80 MHz band is punctured and a 40 MHz band within the fourth 80 MHz band is punctured in the 320 MHz band, wherein the twelfth pattern is a pattern in which the fourth 80 MHz band is punctured and a 40 MHz band within the first 80 MHz band is punctured in the 320 MHz band, wherein the thirteenth pattern is a pattern in which the fourth 80 MHz band is punctured and a 40 MHz band in the second 80 MHz band is punctured in the 320 MHz band, wherein the fourteenth pattern is a pattern in which the fourth 80 MHz band is punctured and a 40 MHz band within the third 80 MHz band is punctured in the 320 MHz band.

9. The method of claim 7, wherein one element of the first phase rotation value is a phase rotation value applied to each 20 MHz band of the 320 MHz band, wherein the 320 MHz band consists of subcarriers having subcarrier indexes from −512 to 511, wherein a first 1 of the first phase rotation values is applied to subcarriers having a subcarrier index of −512 to −449, wherein a second 1 of the first phase rotation value is applied to subcarriers having a subcarrier index of −448 to −385, wherein a third 1 of the first phase rotation value is applied to subcarriers having subcarrier indices from −384 to −321, wherein a fourth −1 of the first phase rotation value is applied to subcarriers having subcarrier indexes from −320 to −257, wherein a fifth 1 of the first phase rotation values is applied to a subcarrier having a subcarrier index of −256 to −193, wherein a sixth 1 of the first phase rotation values is applied to subcarriers having subcarrier indices from −192 to −129, wherein a seventh 1 of the first phase rotation values is applied to subcarriers having a subcarrier index of −128 to −65, wherein an eighth −1 of the first phase rotation values is applied to subcarriers having a subcarrier index of −64 to −1, wherein a ninth −1 of the first phase rotation values is applied to subcarriers having subcarrier indexes from 0 to 63, wherein a tenth −1 of the first phase rotation values is applied to subcarriers having subcarrier indexes from 64 to 127, wherein an eleventh −1 of the first phase rotation values is applied to subcarriers having subcarrier indexes from 128 to 191, wherein a twelfth 1 of the first phase rotation values is applied to subcarriers having a subcarrier index of 192 to 255, wherein a thirteenth −1 among the first phase rotation values is applied to subcarriers having subcarrier indices from 256 to 319, wherein a fourteenth −1 of the first phase rotation values is applied to subcarriers having subcarrier indices from 320 to 383, wherein a fifteenth 1 of the first phase rotation values is applied to subcarriers having subcarrier indices from 384 to 447, wherein a sixteenth −1 of the first phase rotation values is applied to subcarriers having subcarrier indices 448 to 511.

10. The method of claim 7, wherein the legacy preamble includes a Legacy-Short Training Field (L-STF), a Legacy-Long Training Field (L-LTF) and a Legacy-Signal (L-SIG), wherein the first phase rotation value is a phase rotation value for the 320 MHz band to obtain an optimal Peak-to-Average Power Ratio (PAPR) of the L-STF and the L-LTF, wherein the optimal PAPR of the L-STF and the L-LTF are obtained based on a combination of a radio frequency (RF) used when transmitting the PPDU, wherein the combination of the RF includes a combination of two RFs with 160 MHz capability or one RF with 320 MHz capability.

11. The method of claim 7, wherein the first signal field is a Universal-Signal (U-SIG), the second signal field is an Extremely High Throughput-Signal (EHT-SIG), wherein the first signal field includes information on the first preamble puncturing pattern.

* * * * *